(12) United States Patent
Chen et al.

(10) Patent No.: US 11,200,514 B1
(45) Date of Patent: Dec. 14, 2021

(54) SEMI-SUPERVISED CLASSIFICATION SYSTEM

(71) Applicant: SAS Institute Inc., Cary, NC (US)

(72) Inventors: Xu Chen, Cary, NC (US); Xinmin Wu, Cary, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 17/342,825

(22) Filed: Jun. 9, 2021

Related U.S. Application Data

(60) Provisional application No. 63/154,649, filed on Feb. 26, 2021, provisional application No. 63/077,773, filed on Sep. 14, 2020.

(51) Int. Cl.
*G06N 20/00* (2019.01)
(52) U.S. Cl.
CPC .................................. *G06N 20/00* (2019.01)
(58) Field of Classification Search
CPC .................................................... G06N 20/00
See application file for complete search history.

(56) References Cited

PUBLICATIONS

Yang, Jun, et al. "Multi-classification for malicious URL based on improved semi-supervised algorithm." 2017 IEEE International Conference on Computational Science and Engineering (CSE) and IEEE International Conference on Embedded and Ubiquitous Computing (EUC). vol. 1. IEEE, 2017. (Year: 2017).*
Van Engelen, Jesper E., and Holger H. Hoos. "A survey on semi-supervised learning." Machine Learning 109.2 (2020): 373-440. (Year: 2020).*
Zhou et al., "Learning with local and global consistency" NIPS'03: Proceedings of the 16th International Conference on Neural Information Processing Systems Dec. 2003 pp. 321-328.
P.K, Mallapragada, R Jin, Y Liu, "SemiBoost: Boosting for Semi-supervised Learning," IEEE Transactions on Pattern Analysis and Machine Intelligence, vol. 31, Issue 11, 2009.
Microsoft/LightGBM https://github.com/microsoft/Lightgbmm, printed Jun. 17, 2021, first page only.
Jason Brownlee, A Gentle Introduction to the Gradient Boosting Algorithm for Machine Learning, Machine Learning Mastery, https://machinelearningmastery.com/gentle-introduction-gradient-boosting-algorithm-machine-learning/, last updated Aug. 15, 2020.

(Continued)

*Primary Examiner* — Vincent Gonzales
(74) *Attorney, Agent, or Firm* — Bell & Manning, LLC

(57) ABSTRACT

Unclassified observations are classified. Similarity values are computed for each unclassified observation and for each target variable value. A confidence value is computed for each unclassified observation using the similarity values. A high-confidence threshold value and a low-confidence threshold value are computed from the confidence values. For each observation, when the confidence value is greater than the high-confidence threshold value, the observation is added to a training dataset and, when the confidence value is greater than the low-confidence threshold value and less than the high-confidence threshold value, the observation is added to the training dataset based on a comparison between a random value drawn from a uniform distribution and an inclusion percentage value. A classification model is trained with the training dataset and classified observations. The trained classification model is executed with the unclassified observations to determine a label assignment.

30 Claims, 17 Drawing Sheets

(56) References Cited

PUBLICATIONS

G. Ke, Q. Meng, T. Finley, T. Wang, W. Chen, W. Ma, Q. Ye, and T.-Y. Liu. "Lightgbm: A highly efficient gradient boosting decision tree". In Advances in Neural Information Processing Systems, pp. 3149-3157, 2017.

Zhai et al., A Direct Boosting Approach for Semi-Supervised Classification, Proceedings of the Twenty-Fourth International Joint Conference on Artificial Intelligence, 2015, pp. 40254032.

Kaggle, Breast Cancer Dataset Analysis, Feb. 25, 2017 https://www.kaggle.com/ibronchal/breast-cancer-dataset-analysis.

Zhao et al., "A Safe Semi-supervised Classification Algorithm Using Multiple Classifiers Ensemble," Neural Processing Letters, Jan. 11, 2020.

Zeisl et al., On-line Semi-Supervised Multiple-Instance Boosting, The Twenty-Third IEEE Conference on Computer Vision and Pattern Recognition, CVPR 2010, San Francisco, Ca, USA, Jun. 13-18, 2010.

Valizadegan et al., "Semi-Supervised Boosting for Multi-Class Classification," ECML PKDD 2008, Part II, LNAI 5212, pp. 5237-5537, 2008.

\* cited by examiner

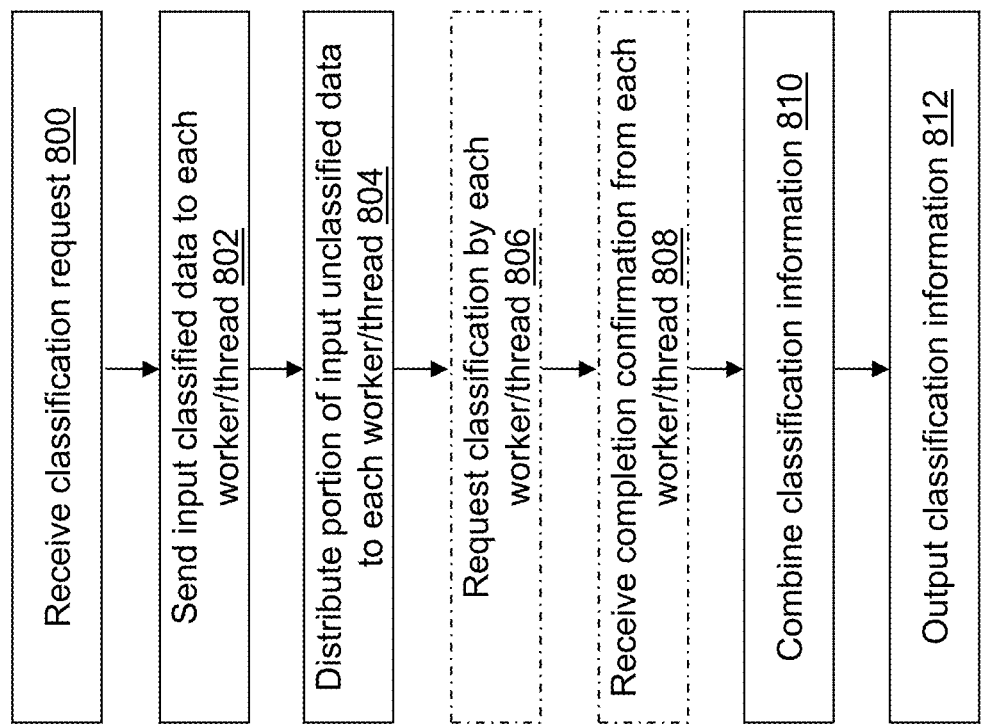

SEMI-SUPERVISED CLASSIFICATION SYSTEM

CROSS-REFERENCE TO RELATED APPLICATIONS

The present application claims the benefit of and priority based on 35 U.S.C. § 119(e) to U.S. Provisional Patent Application No. 63/154,649 filed Feb. 26, 2021, the entire contents of which are hereby incorporated by reference. The present application also claims the benefit of and priority based on 35 U.S.C. § 119(e) to U.S. Provisional Patent Application No. 63/077,773 filed Sep. 14, 2020, the entire contents of which are hereby incorporated by reference.

BACKGROUND

Facilitating effective decision making requires the transformation of relevant data to high-quality classification models. Machine learning defines models that can be used to predict occurrence of an event, for example, from sensor data or signal data, or recognize/classify an object, for example, in an image, in text, in a web page, in voice data, in sensor data, etc. Machine learning algorithms can be classified into three categories: unsupervised learning, supervised learning, and semi-supervised learning. Unsupervised learning does not require that a target (dependent) variable y be classified in training data to indicate occurrence or non-occurrence of the event or to recognize/classify the object. An unsupervised learning system predicts the class, target variable y, in training data by defining a model that describes hidden structure in the training data.

Supervised learning requires that the target (dependent) variable y be labeled in training data so that a model can be built to predict the label of new unlabeled data. A supervised learning system discards an observation in the training data that is not labeled. While supervised learning algorithms are typically better predictors/classifiers, labeling training data often requires a physical experiment or a statistical trial, and human labor is usually required. As a result, it may be very complex and expensive to fully label an entire training dataset. A semi-supervised learning system only requires that the target (dependent) variable y be labeled in a small portion of the training data and uses the unlabeled training data in the training dataset to define the classification model.

A gradient boosting tree machine learning model is an example of a well-known supervised learning algorithm that trains an ensemble of classifiers while iteratively strengthening the weak classifiers. However, to achieve a good performance, the gradient boosting tree machine learning model relies on a large amount of labeled data.

SUMMARY

In an example embodiment, a non-transitory computer-readable medium is provided having stored thereon computer-readable instructions that when executed by a computing device, cause the computing device to predict occurrence of an event or to classify an object using semi-supervised data to label unlabeled data in a dataset. A similarity matrix is computed using a kernel function with a plurality of observation vectors. The plurality of observation vectors includes a plurality of unclassified observation vectors and a plurality of classified observation vectors. A target variable value is defined to represent a label for each respective observation vector of the plurality of classified observation vectors. The target variable value is not defined to represent the label for each respective observation vector of the plurality of unclassified observation vectors. A classification model is trained with the plurality of classified observation vectors. The trained classification model is executed with the plurality of unclassified observation vectors to determine a probability of a label assignment to each observation vector of the plurality of unclassified observation vectors and to predict the target variable value for each observation vector of the plurality of unclassified observation vectors.

(A) Similarity values are computed for each observation vector of the plurality of unclassified observation vectors and for each permissible unique target variable value using a classification function and the computed similarity matrix. (B) A confidence value is computed for each observation vector of the plurality of unclassified observation vectors using the computed similarity values for each respective observation vector of the plurality of unclassified observation vectors. (C) A high-confidence threshold value is computed from confidence values computed in (B) for the plurality of unclassified observation vectors. (D) A low-confidence threshold value is computed from the confidence values computed in (B). (E) A training dataset is initialized with each observation vector of the plurality of classified observation vectors. (F) For each observation vector of the plurality of unclassified observation vectors, when the confidence value for a respective observation vector of the plurality of unclassified observation vectors is greater than the computed high-confidence threshold value, the respective observation vector is added to the training dataset and, when the confidence value for a respective observation vector of the plurality of unclassified observation vectors is greater than the computed low-confidence threshold value and less than the computed high-confidence threshold value, the respective observation vector is added to the training dataset based on a comparison between a random value drawn from a uniform distribution and a predefined inclusion percentage value. (G) A second classification model is trained with the training dataset. (H) The trained second classification model is executed with the plurality of unclassified observation vectors to determine a second probability of the label assignment to each observation vector of the plurality of unclassified observation vectors and to predict a second target variable value for each observation vector of the plurality of unclassified observation vectors. (I) A classifier weight is computed for the trained second classification model using the determined second probability of the label assignment and the second label predicted for each observation vector of the plurality of unclassified observation vectors. (J) The classification function is updated using the computed classifier weight and the second label predicted for each observation vector of the plurality of unclassified observation vectors. (A) through (J) are repeated until a convergence parameter value indicates the classifier weight has converged. The second label predicted for each observation vector of the plurality of unclassified observation vectors is output.

In another example embodiment, a computing device is provided. The computing device includes, but is not limited to, a processor and a non-transitory computer-readable medium operably coupled to the processor. The computer-readable medium has instructions stored thereon that, when executed by the processor, cause the computing device to predict occurrence of an event or to classify an object using semi-supervised data to label unlabeled data in a dataset.

In yet another example embodiment, a method of predicting occurrence of an event or of classifying an object using semi-supervised data to label unlabeled data in a dataset is provided.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

FIG. 8 depicts a flow diagram illustrating examples of operations performed by the controller device of FIG. 5 in accordance with an illustrative embodiment.

DETAILED DESCRIPTION

A classification application 122 trains a semi-supervised gradient boosting tree machine learning model that combines information from classified (labeled) observation vectors and unclassified (unlabeled) observation vectors. Similarity values for the unclassified observation vectors are computed and a sampling technique is used to determine which unclassified observation vectors with their predicted labels are added to a training dataset for a next iteration of training, for example, the semi-supervised gradient boosting tree machine learning model. Weights on classifiers of the semi-supervised gradient boosting tree machine learning model are adjusted and recomputed iteratively to integrate the information from the unclassified observation vectors and to enhance the weak classifiers in the ensemble learning process. Comparative results described herein show that classification application 122 provides improved classification accuracy relative to an existing supervised gradient boosting tree machine learning model with a small amount of classified data. Comparative results described herein also show that classification application 122 provides improved classification accuracy relative to an existing semi-supervised machine learning model. There are applications for classification application 122 in many areas such as process control and equipment health monitoring, image processing and classification, data segmentation, data analysis, etc.

For instance, in the technical area of medical image diagnosis, there is a limited amount of available labeled images. The traditional gradient boosting algorithm is supervised, which requires a large amount of labeled images to fully demonstrate the power of the ensemble classifiers. Classification application 122 is capable of combining unlabeled images with a limited amount of labeled images to improve the classification performance significantly.

Figure 1:
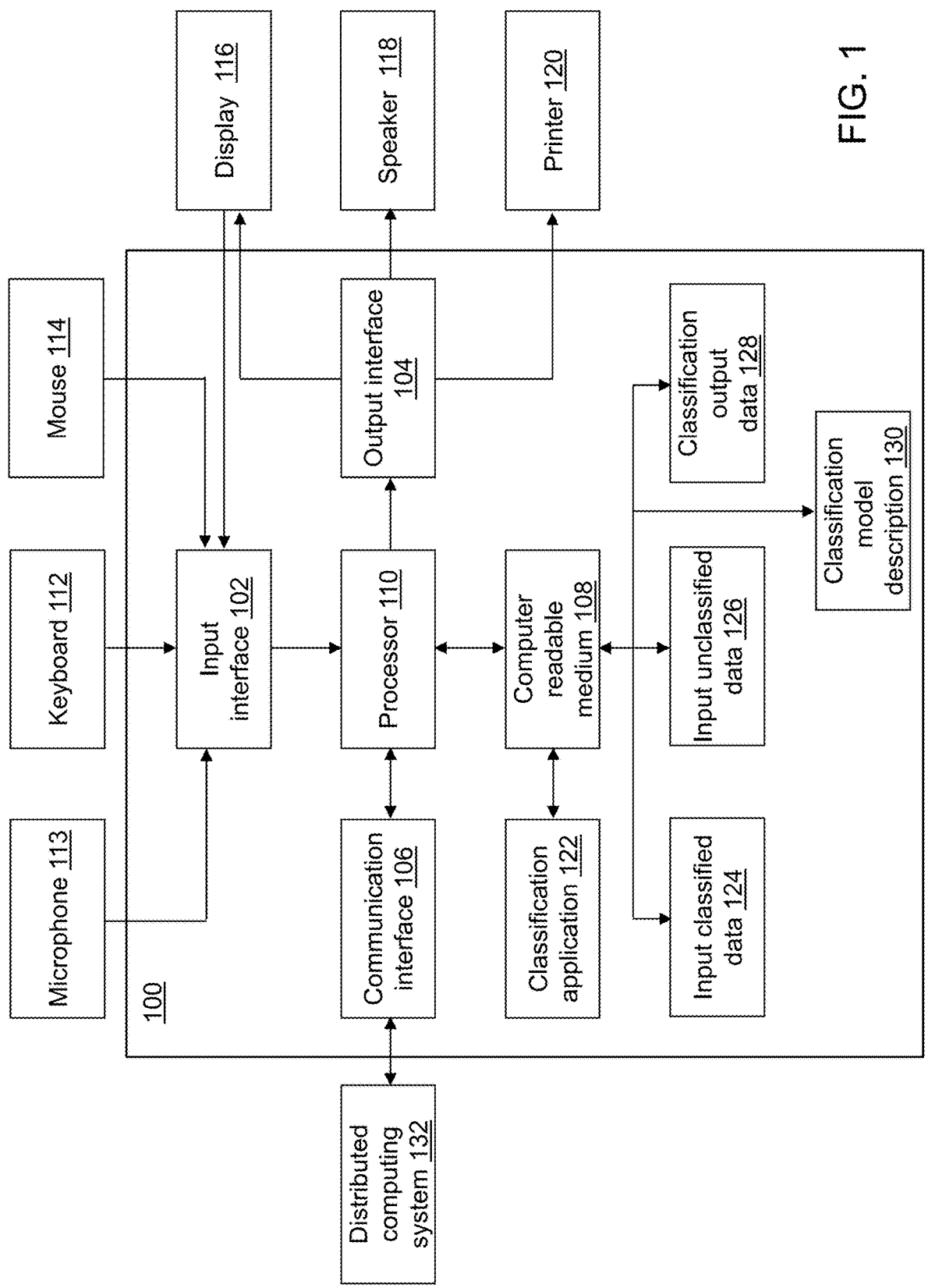
FIG. 1 depicts a block diagram of a classification device in accordance with an illustrative embodiment.

Referring to FIG. 1, a block diagram of a classification device 100 is shown in accordance with an illustrative embodiment. Classification device 100 may include an input interface 102, an output interface 104, a communication interface 106, a non-transitory computer-readable medium 108, a processor 110, classification application 122, input classified data 124, input unclassified data 126, classification output data 128, and classification model description 130. Fewer, different, and/or additional components may be incorporated into classification device 100.

Input interface 102 provides an interface for receiving information from the user or another device for entry into classification device 100 as understood by those skilled in the art. Input interface 102 may interface with various input technologies including, but not limited to, a keyboard 112, a microphone 113, a mouse 114, a display 116, a track ball, a keypad, one or more buttons, etc. to allow the user to enter information into classification device 100 or to make selections presented in a user interface displayed on display 116.

The same interface may support both input interface 102 and output interface 104. For example, display 116 comprising a touch screen provides a mechanism for user input and for presentation of output to the user. Classification device 100 may have one or more input interfaces that use the same or a different input interface technology. The input interface technology further may be accessible by classification device 100 through communication interface 106.

Output interface 104 provides an interface for outputting information for review by a user of classification device 100 and/or for use by another application or device. For example, output interface 104 may interface with various output technologies including, but not limited to, display 116, a speaker 118, a printer 120, etc. Classification device 100 may have one or more output interfaces that use the same or a different output interface technology. The output interface technology further may be accessible by classification device 100 through communication interface 106.

Communication interface 106 provides an interface for receiving and transmitting data between devices using various protocols, transmission technologies, and media as understood by those skilled in the art. Communication interface 106 may support communication using various transmission media that may be wired and/or wireless. Classification device 100 may have one or more communication interfaces that use the same or a different communication interface technology. For example, classification device 100 may support communication using an Ethernet port, a Bluetooth® antenna, a telephone jack, a USB port, etc. Data and/or messages may be transferred between classification device 100 and another computing device of a distributed computing system 132 using communication interface 106.

Computer-readable medium 108 is a non-transitory electronic holding place or storage for information so the information can be accessed by processor 110 as understood by those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Classification device 100 may have one or more computer-readable media that use the same or a different memory media technology. For example, computer-readable medium 108 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Classification device 100 also may have one or more drives that support the loading of a memory media such as a CD, DVD, an external hard drive, etc. One or more external hard drives further may be connected to classification device 100 using communication interface 106.

Processor 110 executes instructions as understood by those skilled in the art. The instructions may be carried out by a special purpose computer, logic circuits, or hardware circuits. Processor 110 may be implemented in hardware and/or firmware. Processor 110 executes an instruction, meaning it performs/controls the operations called for by that instruction. The term "execution" is the process of running an application or the carrying out of the operation called for by an instruction. The instructions may be written using one or more programming languages, scripting languages, assembly languages, etc. Processor 110 operably couples with input interface 102, with output interface 104, with communication interface 106, and with computer-readable medium 108 to receive, to send, and to process information. Processor 110 may retrieve a set of instructions from a permanent memory device and copy the instructions in an executable form to a temporary memory device that is generally some form of RAM. Classification device 100 may include a plurality of processors that use the same or a different processing technology.

Some machine-learning approaches may be more efficiently and speedily executed and processed with machine-learning specific processors (e.g., not a generic central processing unit (CPU)). Such processors may also provide additional energy savings when compared to generic CPUs. For example, some of these processors can include a graphical processing unit, an application-specific integrated circuit, a field-programmable gate array, an artificial intelligence accelerator, a purpose-built chip architecture for machine learning, and/or some other machine-learning specific processor that implements a machine learning approach using semiconductor (e.g., silicon, gallium arsenide) devices. These processors may also be employed in heterogeneous computing architectures with a number of and a variety of different types of cores, engines, nodes, and/or layers to achieve additional various energy efficiencies, processing speed improvements, data communication speed improvements, and/or data efficiency targets and improvements throughout various parts of the system.

Classification application 122 performs operations associated with classifying each observation vector included in input unclassified data 126. Some or all of the operations described herein may be embodied in classification application 122. The operations may be implemented using hardware, firmware, software, or any combination of these methods.

Referring to the example embodiment of FIG. 1, classification application 122 is implemented in software (comprised of computer-readable and/or computer-executable instructions) stored in computer-readable medium 108 and accessible by processor 110 for execution of the instructions that embody the operations of classification application 122. Classification application 122 may be written using one or more programming languages, assembly languages, scripting languages, etc. Classification application 122 may be integrated with other analytic tools. As an example, classification application 122 may be part of an integrated data analytics software application and/or software architecture such as that offered by SAS Institute Inc. of Cary, N.C., USA. Merely for illustration, classification application 122 may be implemented using or integrated with one or more SAS software tools such as JMP®, Base SAS, SAS® Enterprise Miner™, SAS® Event Stream Processing, SAS/STAT®, SAS® High Performance Analytics Server, SAS® Visual Data Mining and Machine Learning, SAS® LASR™, SAS® In-Database Products, SAS® Scalable Performance Data Engine, SAS® Cloud Analytic Services (CAS), SAS/OR®, SAS/ETS®, SAS® Visual Analytics, SAS® Viya™, and SAS In-Memory Statistics for Hadoop®, etc. all of which are developed and provided by SAS Institute Inc. of Cary, N.C., USA. Data mining, statistical analytics, and response prediction are practically applied in a wide variety of industries to solve technical problems.

Classification application 122 may be implemented as a Web application. For example, classification application 122 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java® applet, an extensible markup language (XML) file, or any other type of file supported by HTTP.

Input classified data 124 and input unclassified data 126 may include, for example, a plurality of rows and a plurality of columns. The plurality of rows may be referred to as observation vectors or records (observations), and the columns may be referred to as variables. In an alternative embodiment, input classified data 124 and input unclassified data 126 may be transposed. The plurality of variables defines a vector $x_i$ for each observation vector i=1, 2, ... N, where N is a number of the observation vectors included in input classified data 124 and input unclassified data 126. Input classified data 124 includes a target variable value $y_i$ for each observation vector that indicates a label or class or other characteristic defined for the respective observation vector $x_i$ for i=1, 2, ..., $N_c$, where $N_c$ is a number of the observation vectors included in input classified data 124. Input classified data 124 includes observation vectors that have been labeled or classified, for example, by a human or other machine learning labeling process. For example, the label or classification may indicate a class for the observation vector or otherwise identify a characteristic of the observation vector. For example, a $y_i$ value may indicate the label determined for the observation vector $x_i$ such as what the observation vector $x_i$ in the form of text means, what the observation vector $x_i$ in the form of image data does or does not represent (i.e., text, a medical condition, an equipment failure, an intrusion, a terrain feature, etc.), what the observation vector $x_i$ in the form of sensor signal data does or does not represent (i.e., voice, speech, an equipment failure, an intrusion, a terrain feature, etc.), etc.

Input unclassified data 126 includes observation vectors $x_i$ that have not been labeled such that the $y_i$ value has not been determined though a value such as zero may be included in a column associated with the $y_i$ values. For example, input unclassified data 126 includes the respective observation vector $x_i$ for i=1, 2, ..., $N_u$, where $N_u$ is a number of the observation vectors included in input unclassified data 126.

Input classified data 124 and input unclassified data 126 may be stored in a single database, file, etc. where the $y_i$ value may indicate whether the associated observation vector has been labeled or classified. For example, a $y_i$ value of zero may indicate an unclassified observation vector though in other embodiments, the $y_i$ value of zero may indicate a label, and therefore, a classified observation vector.

Input classified data 124 and input unclassified data 126 may include additional variables that are not included in the plurality of variables. One or more variables of the plurality of variables may describe a characteristic of a physical object. For example, if input classified data 124 and input unclassified data 126 include data related to operation of a vehicle, the variables may include a type of vehicle, an oil pressure, a speed, a gear indicator, a gas tank level, a tire pressure for each tire, an engine temperature, a radiator level, etc.

A sensor may measure a physical quantity in an environment to which the sensor is associated and generate a corresponding measurement datum that may be associated with a time that the measurement datum is generated. Illustrative sensors include a microphone, an infrared sensor, a radar, a pressure sensor, a temperature sensor, a position or location sensor, a voltage sensor, a current sensor, a frequency sensor, a humidity sensor, a dewpoint sensor, a camera, a computed tomography machine, a magnetic resonance imaging machine, an x-ray machine, an ultrasound machine, etc. that may be mounted to various components used as part of a system. For example, input classified data 124 and input unclassified data 126 may include image data captured by medical imaging equipment (i.e., computed tomography image, magnetic resonance image, x-ray image, ultrasound image, etc.) of a body part of a living thing. A subset of the image data is labeled and captured in input classified data 124, for example, as either indicating existence of a medical condition or non-existence of the medical condition. Input classified data 124 and input unclassified data 126 may include a reference to image data that may be stored, for example, in an image file or in a video file, and the existence/non-existence label associated with each image file or video file. Input classified data 124 and input unclassified data 126 may include a plurality of such references. The existence/non-existence label or other label may be defined by a clinician or expert in the field to which data stored in input classified data 124 relates.

In data science, engineering, and statistical applications, data often consists of multiple measurements (across sensors, characteristics, responses, etc.) collected across multiple time instances (patients, test subjects, etc.). These measurements may be collected in input classified data 124 and input unclassified data 126 for analysis and processing or streamed to classification device 100 as it is generated. Input classified data 124 and input unclassified data 126 may include data captured as a function of time for one or more physical objects. The data stored in input classified data 124 and input unclassified data 126 may be captured at different time points periodically, intermittently, when an event occurs, etc. Input classified data 124 and input unclassified data 126 may include data captured at a high data rate such as 200 or more observation vectors per second for one or more physical objects. One or more columns of input classified data 124 and input unclassified data 126 may include a time and/or date value. Input classified data 124 and input unclassified data 126 may include data captured under normal and abnormal operating conditions of the physical object.

The data stored in input classified data 124 and input unclassified data 126 may be received directly or indirectly from the source and may or may not be pre-processed in some manner. For example, the data may be pre-processed using an event stream processor such as the SAS® Event Stream Processing Engine (ESPE), developed and provided by SAS Institute Inc. of Cary, N.C., USA. For example, data stored in input classified data 124 and input unclassified data 126 may be generated as part of the Internet of Things (IoT), where things (e.g., machines, devices, phones, sensors) can be connected to networks and the data from these things collected and processed within the things and/or external to the things before being stored in input classified data 124 and input unclassified data 126. For example, the IoT can include sensors in many different devices and types of devices, and high value analytics can be applied to identify hidden relationships and drive increased efficiencies. This can apply to both big data analytics and real-time analytics. Some of these devices may be referred to as edge devices, and may involve edge computing circuitry. These devices may provide a variety of stored or generated data, such as network data or data specific to the network devices themselves. Again, some data may be processed with an ESPE, which may reside in the cloud or in an edge device before being stored in input classified data 124 and input unclassified data 126.

The data stored in input classified data 124 and input unclassified data 126 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art.

Input classified data 124 and input unclassified data 126 may be stored on computer-readable medium 108 or on one or more computer-readable media of distributed computing system 132 and accessed by classification device 100 using communication interface 106, input interface 102, and/or output interface 104. Input classified data 124 and input unclassified data 126 may be stored in various compressed formats such as a coordinate format, a compressed sparse column format, a compressed sparse row format, etc. The data may be organized using delimited fields, such as comma or space separated fields, fixed width fields, using a SAS® dataset, etc. The SAS dataset may be a SAS® file stored in a SAS® library that a SAS® software tool creates and processes. The SAS dataset contains data values that are organized as a table of observation vectors (rows) and variables (columns) that can be processed by one or more SAS software tools.

Input classified data 124 and input unclassified data 126 may be stored using various data structures as known to those skilled in the art including one or more files of a file system, a relational database, one or more tables of a system of tables, a structured query language database, etc. on classification device 100 or on distributed computing system 132. Classification device 100 may coordinate access to input classified data 124 and input unclassified data 126 that is distributed across distributed computing system 132 that may include one or more computing devices. For example, input classified data 124 and input unclassified data 126 may be stored in a cube distributed across a grid of computers as understood by a person of skill in the art. As another example, input classified data 124 and input unclassified data 126 may be stored in a multi-node Hadoop® class. For instance, Apache™ Hadoop® is an open-source software framework for distributed computing supported by the Apache Software Foundation. As another example, input classified data 124 and input unclassified data 126 may be stored in a cloud of computers and accessed using cloud computing technologies, as understood by a person of skill in the art. The SAS® LASR™ Analytic Server may be used as an analytic platform to enable multiple users to concurrently access data stored in input classified data 124 and input unclassified data 126. The SAS Viya open, cloud-ready, in-memory architecture also may be used as an analytic platform to enable multiple users to concurrently access data stored in input classified data 124 and input unclassified data 126. SAS CAS may be used as an analytic server with associated cloud services in SAS Viya. Some systems may use SAS In-Memory Statistics for Hadoop® to read big data once and analyze it several times by persisting it in-memory for the entire session. Some systems may be of other types and configurations.

Figure 2A:
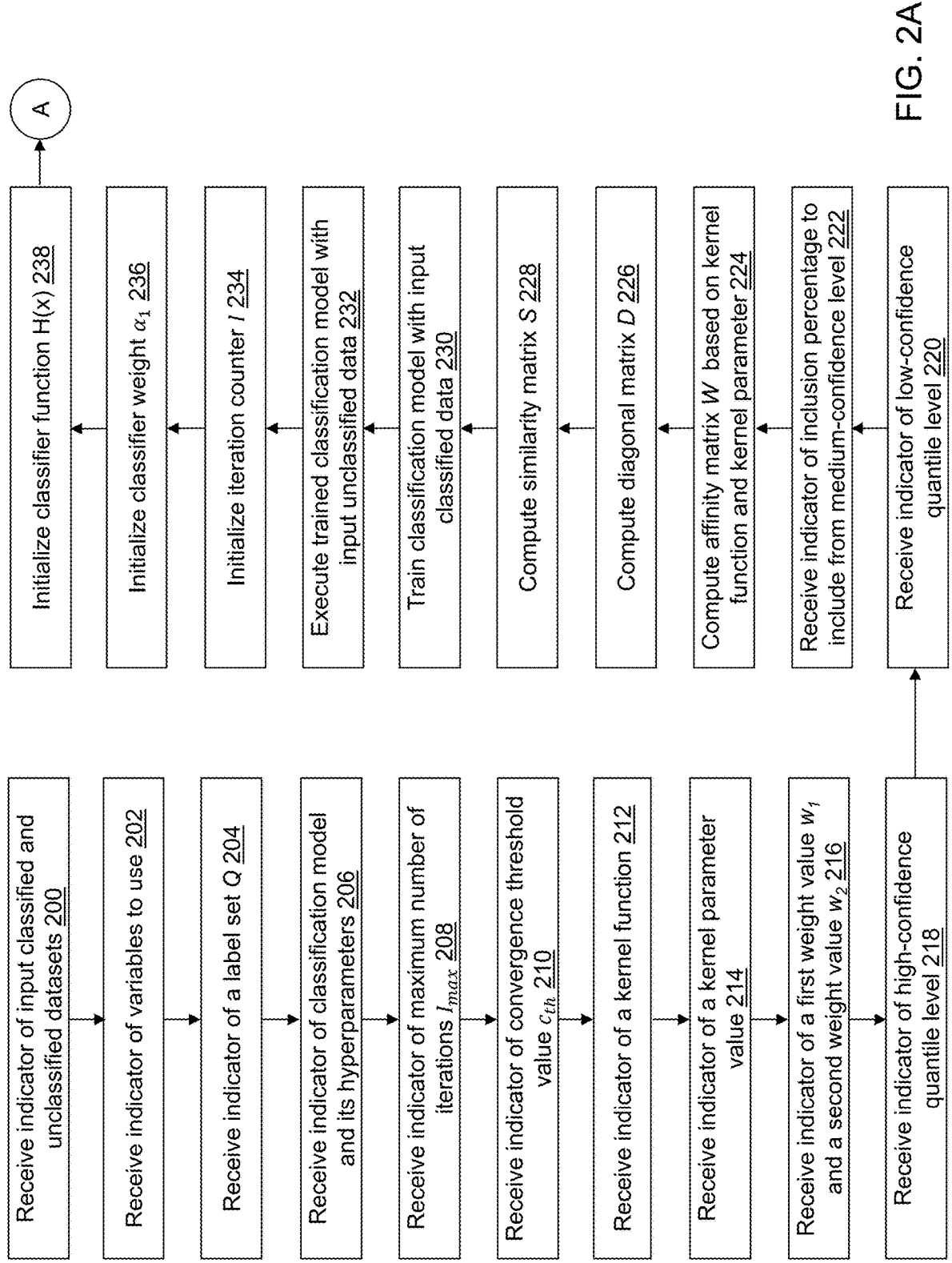
FIGS. 2A, 2B, and 2C depict a flow diagram illustrating examples of operations performed by a classification application of the classification device of FIG. 1 in accordance with an illustrative embodiment.
Figure 2B:
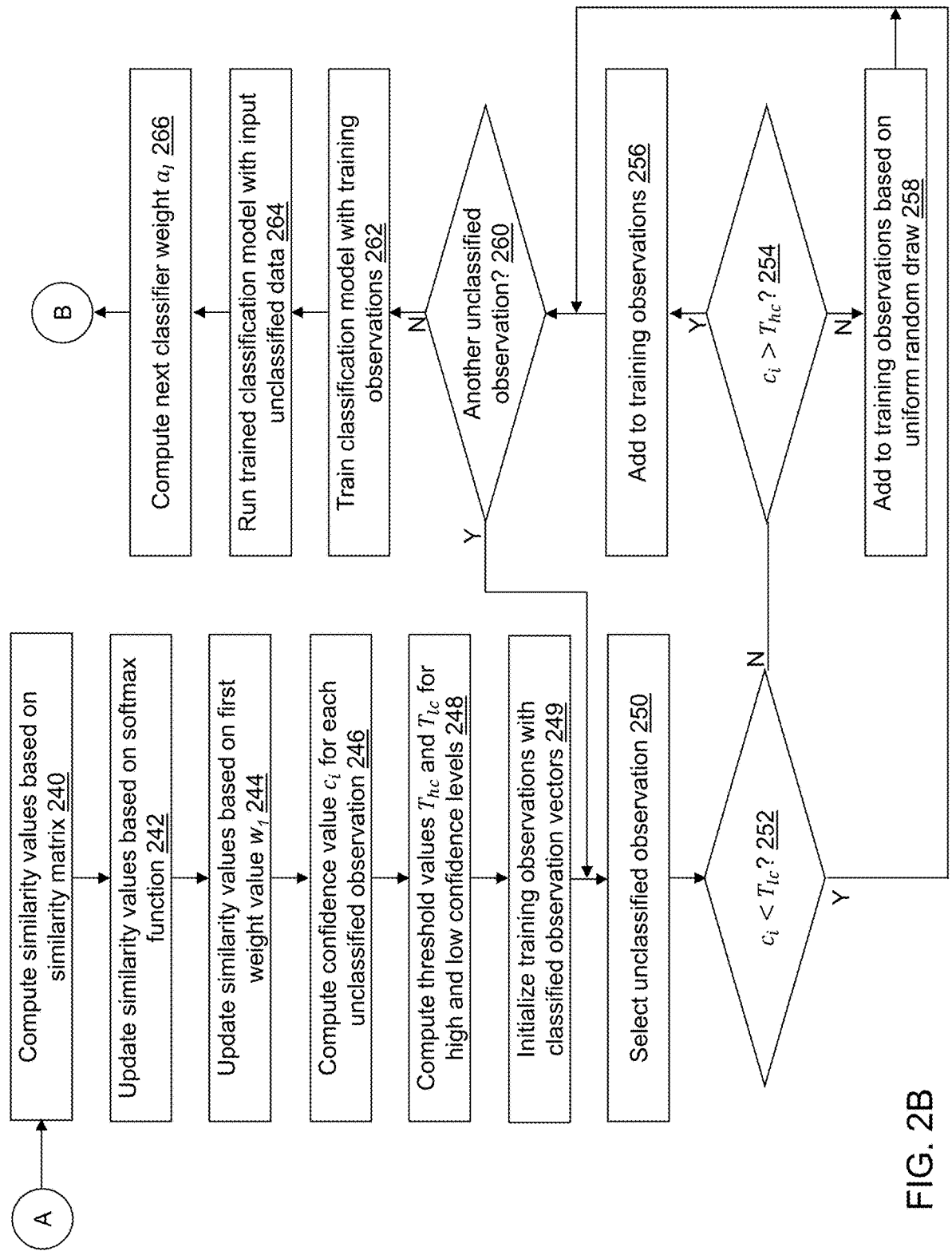
Figure 2C:
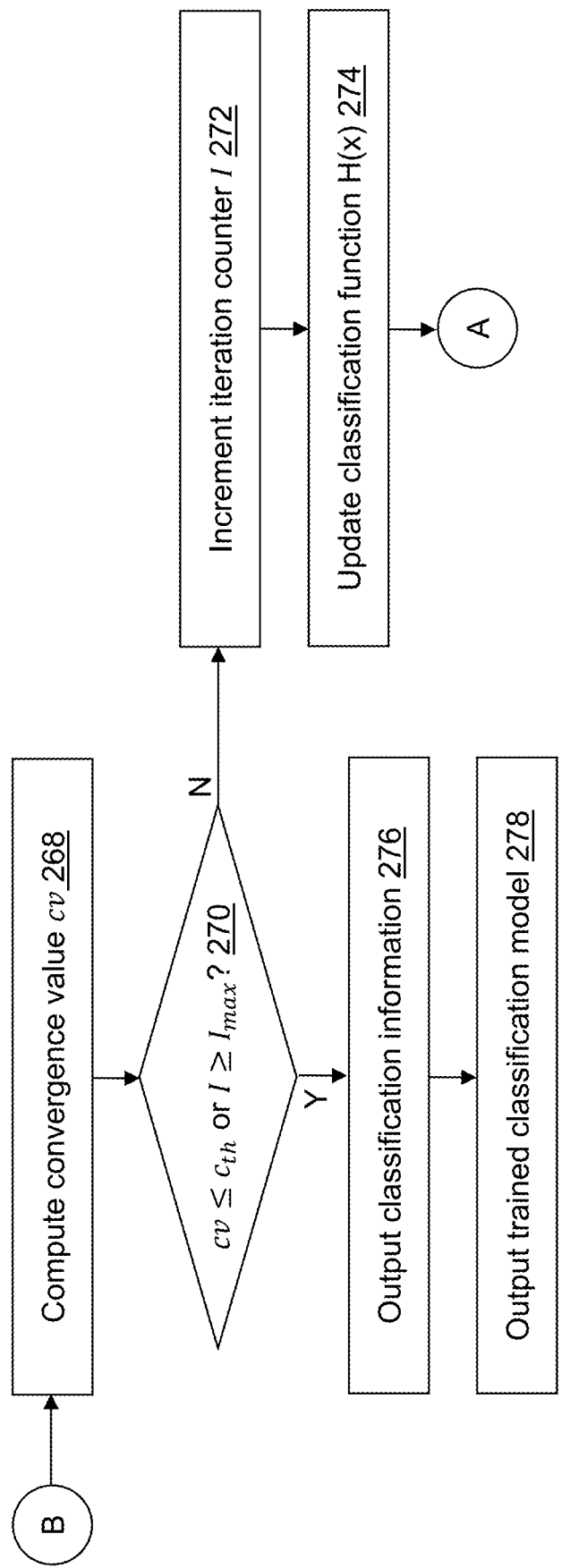

Referring to FIGS. 2A, 2B, and 2C, example operations associated with classification application 122 are described when input classified data 124 and input unclassified data 126 are stored on classification device 100 and accessed by a single thread of classification device 100. Additional, fewer, or different operations may be performed depending on the embodiment of classification application 122. The order of presentation of the operations of FIGS. 2A, 2B, and 2C is not intended to be limiting. Some of the operations may not be performed in some embodiments. Although some of the operational flows are presented in sequence, the various operations may be performed in various repetitions and/or in other orders than those that are illustrated. For example, a user may execute classification application 122, which causes presentation of a first user interface window, which may include a plurality of menus and selectors such as drop-down menus, buttons, text boxes, hyperlinks, etc. associated with classification application 122 as understood by a person of skill in the art. The plurality of menus and selectors may be accessed in various orders. An indicator may indicate one or more user selections from a user interface, one or more data entries into a data field of the user interface, one or more data items read from computer-readable medium 108 or otherwise defined with one or more default values, etc. that are received as an input by classification application 122.

Referring to FIG. 2A, in an operation 200, a first indicator may be received that indicates input classified data 124 and input unclassified data 126. For example, the first indicator indicates a location and a name of input classified data 124 and input unclassified data 126 that may be stored together or separately though they are described herein as separate for simplicity. As an example, the first indicator may be received by classification application 122 after selection from a user interface window or after entry by a user into a user interface window. In an alternative embodiment, input classified data 124 and input unclassified data 126 may not be selectable. For example, a most recently created dataset may be used automatically. The observation vectors included in input classified data 124 define a plurality of classified observation vectors, and the observation vectors included in input unclassified data 126 define a plurality of unclassified observation vectors.

In an operation 202, a second indicator may be received that indicates the plurality of variables to use from input classified data 124 and input unclassified data 126 to define observation vectors. For example, the second indicator may indicate one or more column numbers or one or more column names. As another option, all of the columns of input classified data 124 and input unclassified data 126 except a first or a last column may be assumed to be the plurality of variables. The plurality of variables are the variables that define each observation vector $x_i$. A number of the plurality of variables may be indicated by $N_v$. The second indicator may further indicate a column number or a column name that stores the value for $y_i$ in input classified data 124. As another option, the first or the last column may be assumed to include the value for $y_i$.

In an operation 204, a third indicator may be received that indicates a label set Q associated with input classified data 124 and input unclassified data 126. For example, the label set Q includes a list of permissible values that the $y_i$-variable (target) value of each observation vector $x_i$ may have. For illustration, if input classified data 124 and input unclassified data 126 include text images of numeric digits, the label set Q includes $N_1=10$ permissible values that may be indicated as Q={1, . . . , $N_l$}, where Q=1 may be associated with the digit "0", Q=2 may be associated with the digit "1", Q=3 may be associated with the digit "2", . . . , Q=10 may be associated with the digit "9". $N_l$ is a number of classes in label set Q. No $y_i$-variable (target) value or a variable value of zero may indicate that the associated observation vector $x_i$ is not classified when input classified data 124 and input unclassified data 126 are stored together in memory or in a single dataset. The label set Q further may be a binary indicator that indicates the existence or non-existence of a characteristic of each observation vector such that $N_l=2$. For example, a $y_i$-variable (target) value of −1 may indicate no fraud for a transaction, a $y_i$-variable (target) value of 1 may indicate that the transaction is fraudulent, and a $y_i$-variable (target) value of 0 may indicate that the transaction has not been classified. As another example, a $y_i$-variable (target) value of −1 may indicate no tumor in an image, a $y_i$-variable (target) value of 1 may indicate that the image includes a tumor, and a $y_i$-variable (target) value of 0 may indicate that the image has not been classified.

In an alternative embodiment, the third indicator may not be received and/or selectable. For example, the number of classes $N_l$ and label set Q may be determined automatically by identifying unique values of the $y_i$-variable included in input classified data 124 and including them in label set Q.

When input classified data 124 and input unclassified data 126 are stored together in memory or in a single dataset, input classified data 124 may be extracted. Input classified data 124 and input unclassified data 126 together define a point set $X=\{x_1, \ldots, x_{N_C}, x_{N_C+1}, \ldots, x_N\}$, where N indicates a total number of data points or observation vectors $x_i$, where the observation vectors $x_i$ ($i \leq N_C$) are labeled such that $y_i \in Q$, and the remaining observation vectors $x_i$ ($N_C < i \leq N$) are unlabeled such that $y_i \notin Q$. Thus, $N_C$ indicates a number of classified observation vectors $x_i$ included in input classified data 124. For illustration, $N_C$ may be a small percentage, such as less than 1% of the total number of observation vectors N. $N_u = N - N_C$ indicates the number of unclassified observation vectors. An unclassified point set $X_u = \{x_{N_C+1}, \ldots, x_N\}$, and a classified point set $X_C = \{x_1, \ldots, x_{N_C}\}$.

In an operation 206, a fourth indicator may be received that indicates an ensemble classification model and its hyperparameter values. For example, illustrative ensemble classification models include a gradient boosting tree model, a neural network model, a support vector machine model, etc. Each ensemble classification model predicts a value for Y given explanatory variable X. For example, the fourth indicator indicates a name of a model type. The fourth indicator may be received by classification application 122 after selection from a user interface window or after entry by a user into a user interface window. As an example, a model type may be selected from "Forest", "Gradient Boosting Tree", "Neural Network", "Support Vector Machine", etc. The model type may be labeled or selected in a variety of different manners by the user as understood by a person of skill in the art. In an alternative embodiment, the model type may not be selectable, and a single model type is implemented in training application 122.

The Forest model type automatically adjusts forest hyperparameters to tune a Forest model for minimum error as measured by a specified objective function. The Forest model type creates a decision tree recursively by choosing an input variable and using it to create a rule to split the data into two or more subsets. The process is repeated in each subset, and again in each new subset, and so on until a constraint is met. In the terminology of the tree metaphor, the subsets are nodes, the original data table is a root node, and final unpartitioned subsets are leaves or terminal nodes. A node is an internal node if it is not a leaf. The data in a leaf determine estimates of the value of the target variable. These estimates are subsequently applied to predict the target of a new observation that is assigned to the leaf.

For illustration, a FOREST procedure included in SAS® Visual Data Mining and Machine Learning 8.1 may be used to implement the forest model type in SAS® Viya™. The FOREST procedure creates a predictive model called a forest, which consists of several decision trees, in SAS Viya. The FOREST procedure creates multiple decision trees that differ from each other in two ways: 1) the training data for each tree constitutes a different sample, and each sample is created by sampling, with replacement, observations from the original training data of the forest, and 2) the input variables that are considered for splitting a node are randomly selected from all available inputs. Among these randomly selected variables, the FOREST procedure chooses a single variable, which is associated the most with the target, when it forms a splitting rule. The FOREST procedure creates an ensemble of decision trees to predict a single target of either interval or nominal measurement level. An input variable can have an interval or nominal measurement level.

For illustration, an "autotune" statement used with the FOREST procedure included in SAS® Visual Data Mining and Machine Learning 8.1 may be used to evaluate different hyperparameter configurations and to select the best identified configuration of hyperparameter values for the forest model type. A tuneForest action selects different hyperparameter configurations to run a forestTrain action and a forestScore action multiple times to train and validate the forest model as it searches for a model that has reduced validation error. For illustration, the tuneForest action, the forestTrain action, and the forestScore action are included in SAS® Viya™ and SAS® CAS.

The Gradient Boosting Tree model type automatically adjusts gradient boosting tree parameters to tune a gradient boosting tree model for minimum error as measured by a specified objective function. The Gradient Boosting Tree model type consists of multiple decision trees. For illustration, a GRADBOOST procedure included in SAS® Visual Data Mining and Machine Learning 8.1 may be used to implement the Gradient Boosting Tree model type in SAS® Viya™. The GRADBOOST procedure creates a predictive model called a gradient boosting tree model in SAS Viya. The GRADBOOST procedure creates a predictive model by fitting a set of additive trees.

For illustration, an "autotune" statement used with the GRADBOOST procedure included in SAS® Visual Data Mining and Machine Learning 8.1 may be used to evaluate different hyperparameter configurations and to select the best identified configuration of hyperparameter values for the gradient boosting tree model type. A tuneGradientBoostTree action selects different hyperparameter configurations to run the gbtreeTrain and gbtreeScore actions multiple times to train and validate gradient boosting tree models as it searches for a model that has reduced validation error. For illustration, the gbtreeTrain and gbtreeScore actions are included in the decision Tree action set of SAS® Viya™ and SAS® CAS.

For further illustration, the gradient boosting tree predictive model may be trained using a method described in a paper titled *LightGBM: A Highly Efficient Gradient Boosting Decision Tree* by Guolin Ke et al., published for the 31$^{st}$ Conference on Neural Information Processing Systems (NIPS 2017).

The Neural Network model type automatically adjusts neural network parameters to tune a neural network model for minimum error as measured by a specified objective function. For illustration, a NNET procedure included in SAS® Visual Data Mining and Machine Learning 8.1 may be used to implement the Neural Network model type in SAS® Viya™. The NNET procedure trains a multilayer perceptron neural network. Training a multilayer perceptron neural network relies on an unconstrained minimization of a nonlinear objective function.

For illustration, an "autotune" statement used with the NNET procedure included in SAS® Visual Data Mining and Machine Learning 8.1 may be used to evaluate different hyperparameter configurations and to select the best identified configuration of hyperparameter values for the neural network model type. A tuneNeuralNet action selects different hyperparameter configurations to run the annTrain and annScore actions multiple times to train and validate neural network models as it searches for a model that has reduced validation error. For illustration, the annTrain and annScore actions are included in the neuralNet action set of SAS® Viya™ and SAS® CAS.

The Support Vector Machine model type automatically adjusts support vector machine parameters to tune a support vector machine model for minimum error as measured by a specified objective function. For illustration, a SVMACHINE procedure included in SAS® Visual Data Mining and Machine Learning 8.1 may be used to implement the Support Vector Machine model type in SAS® Viya™. The Support Vector Machine model type computes support vector machine learning classifiers for a binary pattern recognition problem. The SVMACHINE procedure uses both linear and low-degree polynomial kernels to conduct the computation.

For illustration, an "autotune" statement used with the SVMACHINE procedure included in SAS® Visual Data Mining and Machine Learning 8.1 may be used to evaluate different hyperparameter configurations and to select the best identified configuration of hyperparameter values for the support vector machine model type. A tuneSvm action selects different hyperparameter configurations to run the svm Train action of the svm action set, the score action of the astore action set, and the assess action of the percentile action set to train and validate support vector machine models as it searches for a model that has reduced validation error. For illustration, the svm Train action is included in the svm action set of SAS® Viya™ and SAS® CAS.

Hyperparameters define values or various options that may govern a training process and/or govern operation of the selected classification model. The fourth indicator may include specified values for one or more of the hyperparameters based on the indicated ensemble classification model.

In an operation 208, a fifth indicator of a maximum number of iterations $I_{max}$ may be received. In an alternative embodiment, the fifth indicator may not be received. For example, a default value may be stored, for example, in computer-readable medium 108 and used automatically. In another alternative embodiment, the value of the maximum number of iterations $I_{max}$ may not be selectable. Instead, a fixed, predefined value may be used. For illustration, a default value of the maximum number of iterations $I_{max}$ may be 100 though other values may be used.

In an operation 210, a sixth indicator of a convergence threshold value $c_{th}$ may be received. In an alternative embodiment, the sixth indicator may not be received. For example, a default value may be stored, for example, in computer-readable medium 108 and used automatically. In another alternative embodiment, the value of the convergence threshold value $c_{th}$ may not be selectable. Instead, a fixed, predefined value may be used or a stop criterion may be based on the maximum number of iterations $I_{max}$ alone. For illustration, a default value of the convergence threshold value $c_{th}$ may be 0.02 though other values may be used.

In an operation 212, a seventh indicator of a kernel function may be received. For example, the seventh indicator indicates a name of a kernel function. The seventh indicator may be received by classification application 122 after selection from a user interface window or after entry by a user into a user interface window. A default value for the kernel function may further be stored, for example, in computer-readable medium 108. As an example, a kernel function may be selected from "Gaussian", "Exponential", "Linear", "Polynomial", "Sigmoid", "Radial Basis", etc. For example, a default kernel function may be the Gaussian kernel function though any positive definite kernel function may be used. Of course, the kernel function may be labeled or selected in a variety of different manners by the user as understood by a person of skill in the art. In an alternative embodiment, the kernel function may not be selectable, and a single kernel function is implemented in classification application 122. For example, the Gaussian kernel function may be used by default or without allowing a selection. The Gaussian kernel function may be defined as:

$$\exp\frac{-\|x_i - x_j\|^2}{2s^2}$$

where s is a kernel parameter that is termed a Gaussian bandwidth parameter.

In an operation 214, an eighth indicator of a kernel parameter value to use with the kernel function may be received. For example, a value for s, the Gaussian bandwidth parameter, may be received for the Gaussian kernel function. In an alternative embodiment, the eighth indicator may not be received. For example, a default value for the kernel parameter value may be stored, for example, in computer-readable medium 108 and used automatically or the kernel parameter value may not be used. In another alternative embodiment, the value of the kernel parameter may not be selectable. Instead, a fixed, predefined value may be used.

In an operation 216, a ninth indicator of a first weight value $w_1$ and a second weight value $w_2$ may be received. In an alternative embodiment, the first weight value $w_1$ and the second weight value $w_2$ may not be received. For example, default values may be stored, for example, in computer-readable medium 108 and used automatically. In another alternative embodiment, the values of the first weight value $w_1$ and the second weight value $w_2$ may not be selectable. Instead, fixed, predefined values may be used. The first weight value $w_1$ controls a portion of a similarity measure between classified and unclassified observation vectors that is used in a similarity value computation discussed further below. For illustration, a default value for the second weight value $w_1$ may be 12. The second weight value $w_2$ may be defined based on a comparison between $N_u$ and N. For example, when $$\frac{N_u}{N_C} > 0.5,$$

$w_2$=0.1; whereas, when $$\frac{N_u}{N_C} < 0.1,$$

$w_2$=0.5. For example, when $$0.5 \geq \frac{N_u}{N_C} \geq 0.1,$$

a value for the second weight value $w_2$ may be defined using a grid search. The second weight value $w_2$ controls a portion of a classification decision by a trained gradient boosting tree model to include when updating the similarity value computation discussed further below.

In an operation 218, a tenth indicator of a high-confidence quantile level may be received. In an alternative embodiment, the high-confidence quantile level may not be received. For example, a default value for the high-confidence quantile level may be stored, for example, in computer-readable medium 108 and used automatically. In another alternative embodiment, the value of the high-confidence quantile level may not be selectable. Instead, a fixed, predefined value may be used. For illustration, a default value for the high-confidence quantile level may be 95%.

In an operation 220, an eleventh indicator of a low-confidence quantile level may be received. In an alternative embodiment, the low-confidence quantile level may not be received. For example, a default value for the low-confidence quantile level may be stored, for example, in computer-readable medium 108 and used automatically. In another alternative embodiment, the value of the low-confidence quantile level may not be selectable. Instead, a fixed, predefined value may be used. For illustration, a default value for the low-confidence quantile level may be 90%.

In an operation 222, a twelfth indicator of an inclusion percentage value from a medium-confidence level may be received. In an alternative embodiment, the inclusion percentage value may not be received. For example, a default value for the inclusion percentage value may be stored, for example, in computer-readable medium 108 and used automatically. In another alternative embodiment, the value of the inclusion percentage value may not be selectable. Instead, a fixed, predefined value may be used. For illustration, a default value for the inclusion percentage value may be 0.5. Though described as including a high-confidence level and a low-confidence level with a medium-confidence level in between, a greater number of confidence levels may be implemented. For example, a high-confidence level, a medium-confidence level, and a low-confidence level may be defined. A medium-high level between the high-confidence level and the medium-confidence level with a medium-high inclusion percentage value may be defined, and a medium-low level between the medium-confidence level and the low-confidence level with a medium-low inclusion percentage value may be defined to further stratify how observations are included in a training dataset as described further below.

In an operation 224, an affinity matrix W is computed based on the kernel function and the kernel parameter value indicated in operations 212 and 214. For example, using the Gaussian kernel function, the affinity matrix W is defined as $$W_{i,j} = \exp\frac{-\|x_i - x_j\|^2}{2s^2}$$

if $i \neq j$ and $W_{ii} = 0$ for $i = j$, where s is the kernel parameter value, $x_i$ and $x_j$ are observation vectors selected from input classified data 124 and input unclassified data 126, the affinity matrix W is an N×N matrix such that $i = 1, \ldots, N$ and $j = 1, \ldots, N$.

In an operation 226, a diagonal matrix D is computed based on the affinity matrix W. For example, using the Gaussian kernel function, the diagonal matrix D is an N×N matrix and is defined as $$D_{ii} = \sum_{j=1}^{N} W_{ij}$$

and $D_{ij} = 0$ if $i \neq j$.

In an operation 228, a similarity matrix S is computed based on the affinity matrix W and the diagonal matrix D. For example, the similarity matrix S is an N×N matrix and is defined as $S = D^{-1/2} W D^{-1/2}$.

In an operation 230, the classification model indicated in operation 206 is trained using the observation vectors stored in input classified data 124 and the hyperparameters defined in operation 206 to define a trained classification model.

In an operation 232, the trained classification model is executed with input unclassified data 126 to define a probability $d_i$ for each permissible value of the $y_i$-variable (target) value to each observation vector of the plurality of unclassified observation vectors included in input unclassified data 126 based on decisions by the classification model, and a label $y_i$ predicted for each observation vector of the plurality of unclassified observation vectors based on the probability $d_i$ of each label assignment, where a subscript i indicates a value for an $i^{th}$ observation vector of the plurality of unclassified observation vectors. For a binary classifier with label options of 1 and −1, the probability $d_i$ may be the probability that the label 1 option is assigned to a respected observation vector based on decisions using the trained gradient boosting tree model.

Similarity values are also initialized based on the probability $d_i$ computed by the trained classification model for each observation vector of the plurality of unclassified observation vectors and for each permissible value of the $y_i$-variable (target) value. In the illustrative embodiment of a binary classifier, a first similarity value $p_i$ is initialized for each observation vector of the plurality of unclassified observation vectors such that $p_i = d_i$, and a second similarity value $q_i$ is initialized for each observation vector of the plurality of unclassified observation vectors such that $q_i = 1 - d_i$, where a subscript i indicates a value for an $i^{th}$ observation vector of the plurality of unclassified observation vectors.

In an operation 234, an iteration counter I is initialized, for example, as I=2 based on an initialization iteration being I=1.

In an operation 236, a classifier weight is initialized, for example, using $$\alpha_1 = \frac{1}{4} \ln \frac{\sum_{i=1}^{N_u} p_i \delta(h(x_i), 1) + \sum_{i=1}^{N_u} q_i \delta(h(x_i), -1)}{\sum_{i=1}^{N_u} p_i \delta(h(x_i), -1) + \sum_{i=1}^{N_u} q_i \delta(h(x_i), 1)},$$

as described in a paper by P. K., Mallapragada, R. Jin, Y. Liu titled *SemiBoost: Boosting for Semi-supervised Learning* and published in IEEE Transactions on Pattern Analysis and Machine Intelligence, Volume 31, Issue 11 in 2009 (the SemiBoost paper) for a binary classifier with label options of 1 and −1, where $\alpha_1$ is a classifier weight for the trained classification model, $h(x_i)$ is the label predicted by the trained classification model for the $i^{th}$ observation vector of the plurality of unclassified observation vectors, $x_i$ is the $i^{th}$ observation vector of the plurality of unclassified observation vectors, and $\delta( )$ indicates a delta function, where $\delta(h(x_i)) = 1$ when $h(x_i) = 1$, or $\delta(h(x_i), 1) = 0$, when $h(x_i) \neq 1$, and $\delta(h(x_i), -1) = 1$ when $h(x_i) = -1$, or $\delta(h(x_i), -1) = 0$, when $h(x_i) \neq -1$.

In an operation 238, a classifier function H(X) is initialized, for example, using $H(x_i) = \alpha_1 h(x_i)$, and processing continues in an operation 240 shown referring to FIG. 2B.

In operation 240, a similarity value is computed for each observation vector of the plurality of unclassified observation vectors and for each permissible label value using the similarity matrix. For example, the similarity value for a binary classifier includes the first similarity value $p_i$ for a first label assignment value, such as 1, and the second similarity value $q_i$ for a second label assignment value, such as −1. For the binary classifier example, $p_i$ is computed using $$p_i = \sum_{j=1}^{N_C} S_{i,j} e^{-2H(x_i)} \delta(y_j, 1) + \frac{w_1}{2} \sum_{j=1}^{N_u} S_{i,j} e^{H(x_j)-H(x_i)},$$

$i=1, \ldots, N_u$ and $q_i$ is computed using $$q_i = \sum_{j=1}^{N_C} S_{i,j} e^{-2H(x_i)} \delta(y_j, -1) + \frac{w_1}{2} \sum_{j=1}^{N_u} S_{i,j} e^{H(x_i)-H(x_j)},$$

$i=1, \ldots, N_u$, as described in the SemiBoost paper, where $S_{i,j}$ is a similarity value of the similarity matrix computed between the $i^{th}$ observation vector and a $j^{th}$ observation vector of the plurality of unclassified observation vectors, $H(x_i)$ is a classifier function value for the $i^{th}$ observation vector, $H(x_1)$ is a classifier function value for the $j^{th}$ observation vector, $x_j$ is the $j^{th}$ observation vector of the plurality of unclassified observation vectors, $y_j$ is the label predicted for the $j^{th}$ observation vector, $w_1$ is the first weight value, and $\delta(\ )$ indicates a delta function, where $\delta(y_j,1)=1$ when $y_j=1$, or $\delta(y_j,1)=0$, when $y_j \neq 1$. For example, $H(x_i)$ is a classifier weighted label assignment value computed using each previously defined decision tree from the trained gradient boosting tree model with the $i^{th}$ observation vector $x_i$. The first term in each computation is a measure of the consistency between classified observations and unclassified observations and the second term is a measure of the consistency between pairs of the unclassified observations.

In an operation 242, the similarity values are updated based on a softmax function that normalizes the similarity value computed in operation 240 into a probability distribution value between zero and one that is proportional to an exponential of each permissible label value. For the binary classifier example, $(p_i, q_i)$=softmax$(p_i, q_i)$=1, ..., $N_u$.

In an operation 244, the similarity values, for the binary classifier example, are further updated using $p_i=w_2 p_i+(1-w_2)d_i$, i=1, and $q_i=w_2 q_i+(1-w_2)(1-d_i)$, i=1, ..., $N_u$, where $d_i$ is the probability that the first label assignment value is assigned to the $i^{th}$ observation vector as determined from the trained gradient boosting tree model, and $w_2$ is the second weight value. For a non-binary classifier, the similarity values may be further updated using $s_{i,j}=w_2 s_{i,j}+(1-w_2)d_{i,j}$, i=1, ..., $N_u$, j=1, ..., $N_C$, where $s_{i,j}$ is a $j^{th}$ similarity value for the $i^{th}$ observation vector of the plurality of unclassified observation vectors, $d_{i,j}$ is a $j^{th}$ probability that a first unique target variable value is predicted for the $i^{th}$ observation vector of the plurality of unclassified observation vectors, $w_2$ is a predefined second weight value, and $N_C$ is a number of permissible unique target variable values. The similarity values are updated in operation 244 to include both the prediction from the most recently trained gradient boosting tree model that is supervised (trained with classified observation vectors) and the semi-supervised gradient boosting computation based on the similarity matrix of operation 240.

In an operation 246, a confidence value $c_i$ is computed for each observation vector of the plurality of unclassified observation vectors. For example, for the binary classifier, $c_i$=abs$(p_i-q_i)$, i=1, ..., $N_u$.

In an operation 248, a high-confidence threshold $T_{hc}$ and a low-confidence threshold $T_{lc}$ are computed as the quantile values computed from the confidence values computed in operation 246 at the high-confidence quantile level indicated in operation 218 and at the low-confidence quantile level indicated in operation 220, respectively.

In an operation 249, training observations are initialized with the plurality of classified observation vectors.

In an operation 250, an $i^{th}$ observation vector is selected from the plurality of unclassified observation vectors. For example, i may be initialized to one and incremented by one each subsequent iteration of operation 250.

In an operation 252, a determination is made concerning whether $c_i<T_{lc}$ indicating that a confidence in the label assignment is low. When $c_i<T_{lc}$, processing continues in an operation 260 such that the $i^{th}$ observation vector is not added to the training observations. When $c_i \geq T_{lc}$, processing continues in an operation 254.

In operation 254, a determination is made concerning whether $c_i>T_{hc}$ indicating that a confidence in the label assignment is high. When $c_i>T_{hc}$, processing continues in an operation 256. When $c_i \leq T_{hc}$, processing continues in an operation 258.

In operation 256, the $i^{th}$ observation vector is added to the training observations because confidence in the label assignment is high (exceeds $T_{hc}$).

In operation 258, the $i^{th}$ observation vector is added to the training observations when a random draw from a uniform distribution is less than the inclusion percentage value to include from the medium-confidence level indicated in operation 222.

In operation 260, a determination is made concerning whether there is another unclassified observation included in the plurality of unclassified observation vectors. When there is another unclassified observation, processing continues in operation 250 to select a next observation vector. When there is not another unclassified observation, processing continues in an operation 262.

In operation 262, the classification model indicated in operation 206 is trained using the training observations and the hyperparameters defined in operation 206 to define a next classification model. Each iteration of operation 262, the classification model is trained with both the plurality of classified observations as well as a subset of the plurality of unclassified observations based on the confidence value computed in operation 246 for each unclassified observation and the confidence threshold values computed in operation 248. The training observations selected from the observations included in input unclassified data 126 include their predicted label $y_i$ for which the confidence value satisfied the thresholds and/or the inclusion percentage value.

In an operation 264, the classification model trained in operation 262 is executed with the plurality of unclassified observation vectors to define a probability $d_i$ of a label assignment to each observation vector of the plurality of unclassified observation vectors, and a label $y_i$ predicted for each observation vector of the plurality of unclassified observation vectors.

In an operation 266, a classifier weight is computed for the new classifier model trained in operation 262, for example, using $$\alpha_I = \frac{1}{4} \ln \frac{\sum_{i=1}^{N_u} p_i \delta(h(x_i), 1) + \sum_{i=1}^{N_u} q_i \delta(h(x_i), -1)}{\sum_{i=1}^{N_u} p_i \delta(h(x_i), -1) + \sum_{i=1}^{N_u} q_i \delta(h(x_i), 1)},$$

as described in the SemiBoost paper, for a binary classifier with label options of 1 and −1. Processing continues in an operation 268 shown referring to FIG. 2C.

In operation 268, a convergence value cv is computed, for example, using cv=abs($\alpha_I - \alpha_{I-1}$) that is a difference between the current classifier weight and the previous classifier weight.

In an operation 270, a determination is made concerning whether convergence has been achieved or the maximum number of iterations have been performed. When cv≤$c_{th}$ or I≥$I_{max}$, processing continues in an operation 276. When cv>$c_{th}$ and I<$I_{max}$, processing continues in an operation 272.

In operation 272, the iteration counter I is incremented, for example, as I=I+1.

In an operation 274, the classifier function H(X) is updated, for example, using H($x_i$)=H($x_i$)+$\alpha_I$h($x_i$), and processing continues in operation 240.

In operation 276, the class or label identified for each observation vector $x_i$ included in input unclassified data 126 in operation 264 may be stored in classification output data 128 possibly with the respective observation vector $x_i$.

In an operation 278, the parameters that describe the classification model trained in a most recent iteration of operation 262 may be stored in classification model description 130 to define a predictive model. In an illustrative embodiment, an ASTORE procedure implemented by SAS Visual Data Mining and Machine Learning software stores the gradient boosting tree model in a binary file. For example, a savestate statement may be executed to save the trained classification model in classification model description 130.

Figure 3:
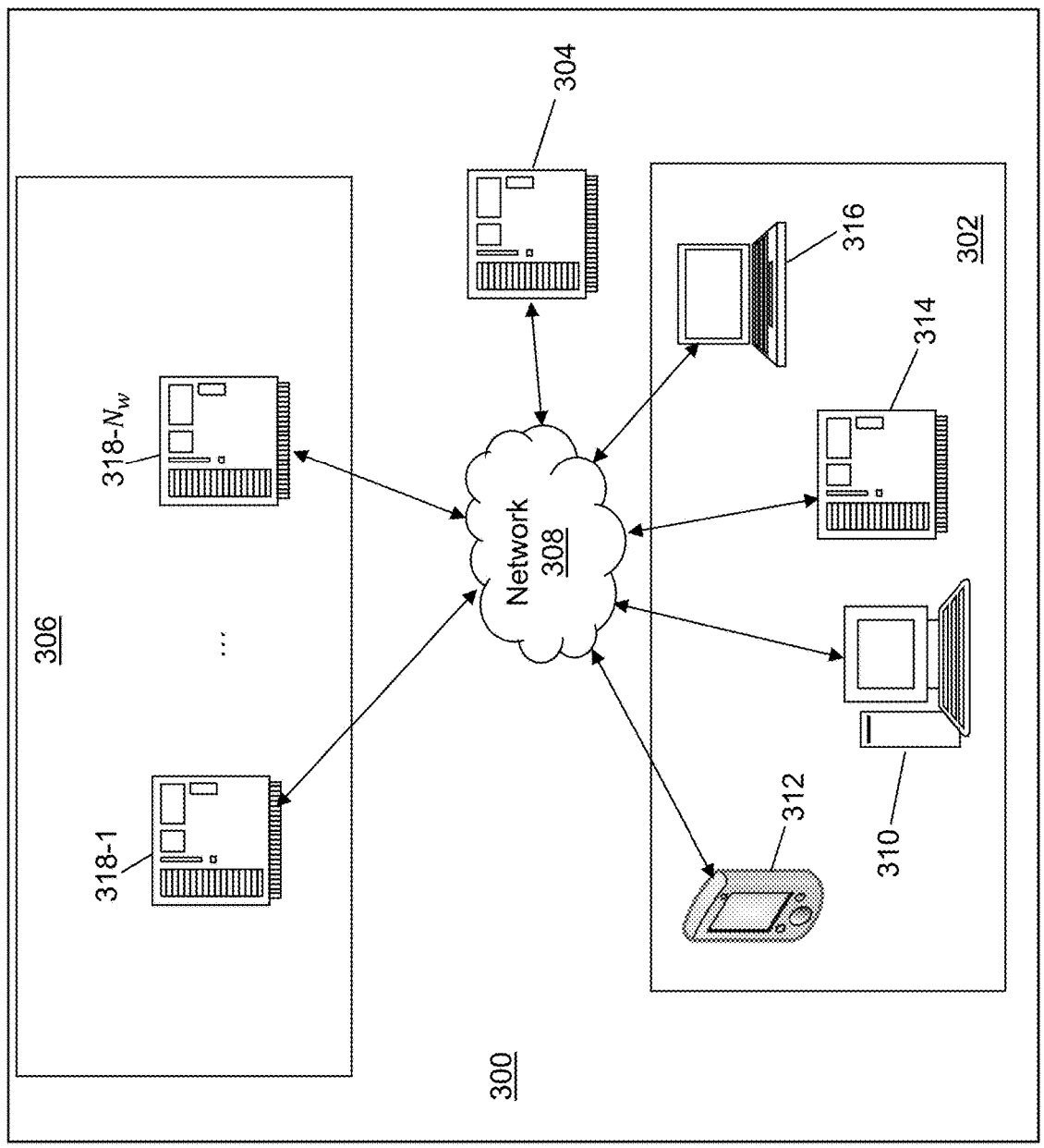
FIG. 3 depicts a block diagram of a classification system in accordance with an illustrative embodiment.

Referring to FIG. 3, a block diagram of a distributed classification system 300 is shown in accordance with an illustrative embodiment. In an illustrative embodiment, distributed classification system 300 may include a user system 302, a controller device 304, a worker system 306, and a network 308. Each of user system 302, controller device 304, and worker system 306 may be composed of one or more discrete computing devices in communication through network 308. Alternatively, user system 302, controller device 304, and worker system 306 may be integrated into a single computing device capable of computing using a plurality of different threads.

Network 308 may include one or more networks of the same or different types. Network 308 can be any type of wired and/or wireless public or private network including a cellular network, a local area network, a wide area network such as the Internet or the World Wide Web, etc. Network 308 further may comprise sub-networks and consist of any number of communication devices.

The one or more computing devices of user system 302 may include computing devices of any form factor such as a desktop 310, a smart phone 312, a server computer 314, a laptop 316, a personal digital assistant, an integrated messaging device, a tablet computer, etc. User system 302 can include any number and any combination of form factors of computing devices that may be organized into subnets. In general, a "server" computer may include faster processors, additional processors, more disk memory, and/or more RAM than another computer form factor and support multi-threading as understood by a person of skill in the art. The computing devices of user system 302 may send and receive signals through network 308 to/from another of the one or more computing devices of user system 302 and/or to/from controller device 304. The one or more computing devices of user system 302 may communicate using various transmission media that may be wired and/or wireless as understood by those skilled in the art. The one or more computing devices of user system 302 may be geographically dispersed from each other and/or co-located.

Figure 4:
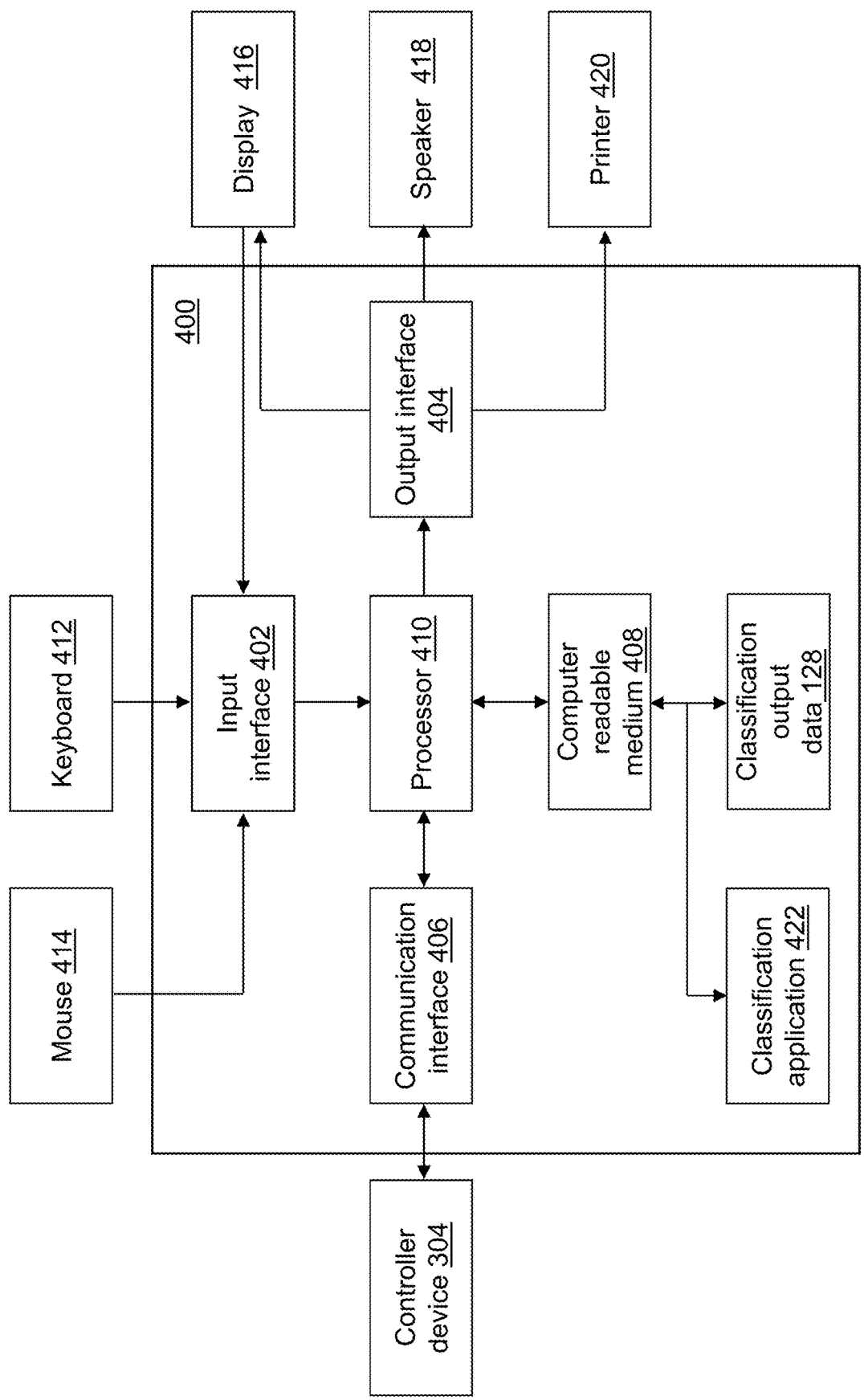
FIG. 4 depicts a block diagram of a user device of the classification system of FIG. 3 in accordance with an illustrative embodiment.

For illustration, referring to FIG. 4, a block diagram of a user device 400 is shown in accordance with an example embodiment. User device 400 is an example computing device of user system 302. For example, each of desktop 310, smart phone 312, server computer 314, and laptop 316 may be an instance of user device 400. User device 400 may include a second input interface 402, a second output interface 404, a second communication interface 406, a second computer-readable medium 408, a second processor 410, and a classification application 422. Each computing device of user system 302 may be executing classification application 422 of the same or different type.

Referring again to FIG. 3, controller device 304 can include any form factor of computing device. For illustration, FIG. 3 represents controller device 304 as a server computer. Controller device 304 may send and receive signals through network 308 to/from user system 302 and/or to/from worker system 306. Controller device 304 may communicate using various transmission media that may be wired and/or wireless as understood by those skilled in the art. Controller device 304 may be implemented on a plurality of computing devices of the same or different type.

Figure 5:
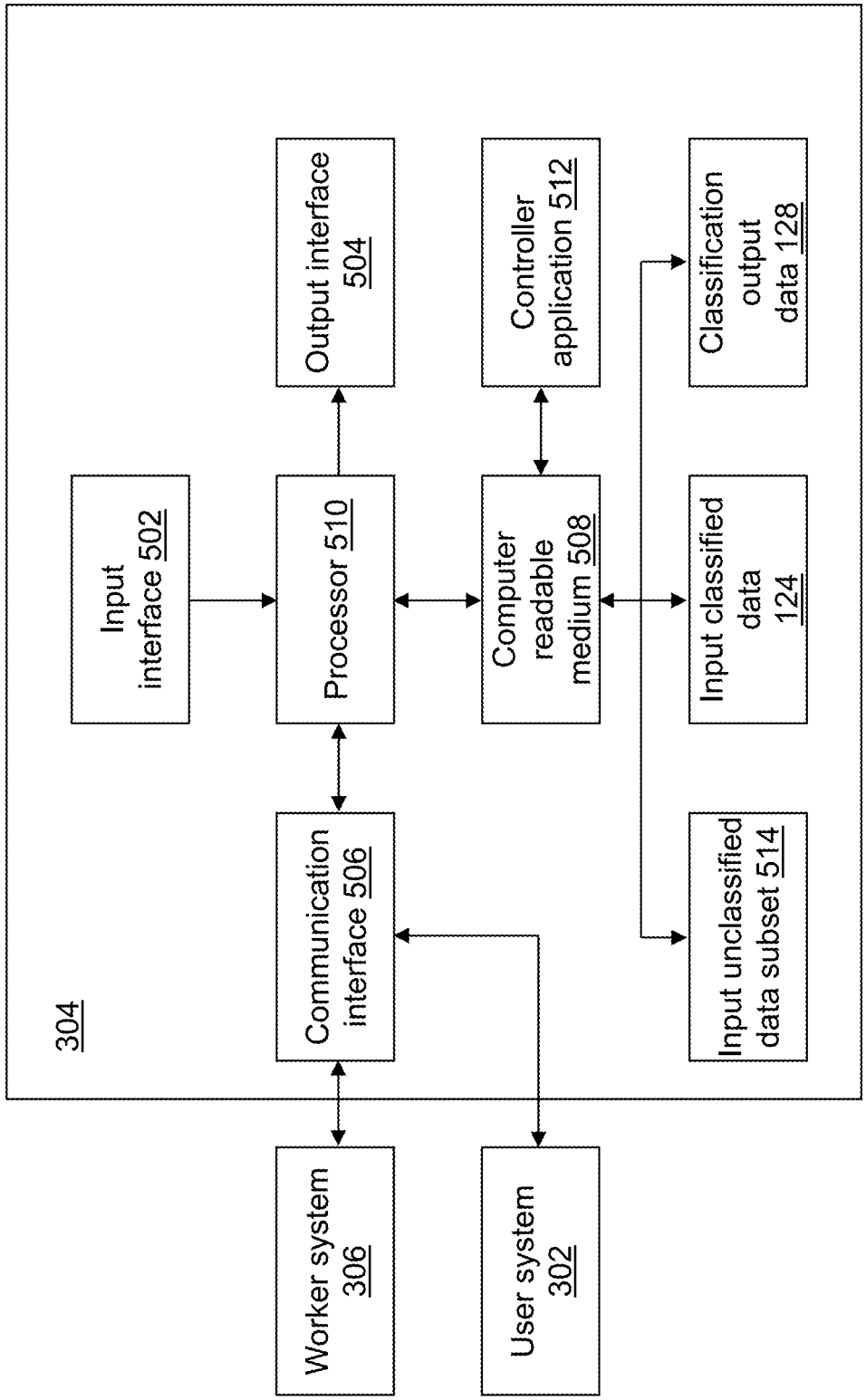
FIG. 5 depicts a block diagram of a controller device of the classification system of FIG. 3 in accordance with an illustrative embodiment.

For illustration, referring to FIG. 5, a block diagram of controller device 304 is shown in accordance with an illustrative embodiment. Controller device 304 may include a third input interface 502, a third output interface 504, a third communication interface 506, a third computer-readable medium 508, a third processor 510, a controller application 512, input classified data 124, input unclassified data subset 514, and classification output data 128.

Referring again to FIG. 3, the one or more computing devices of worker system 306 may include computers of any form factor. Worker system 306 may include a number of computing devices indicated by $N_w$. Worker system 306 may include computers of other form factors such as a desktop or a laptop, etc. Worker system 306 can include any number and any combination of form factors of computing devices. The number of computing devices indicated by $N_w$ may or may not also include controller device 304. A plurality of threads may be associated with each computing device of worker system 306.

The computing devices of worker system 306 may send and receive signals through network 308 to/from controller device 304 and/or to/from user system 302 and/or to/from another computing device of worker system 306. The one or more computing devices of worker system 306 may be geographically dispersed from each other and/or co-located. The one or more computing devices of worker system 306 may communicate using various transmission media that may be wired and/or wireless as understood by those skilled in the art.

Figure 6:
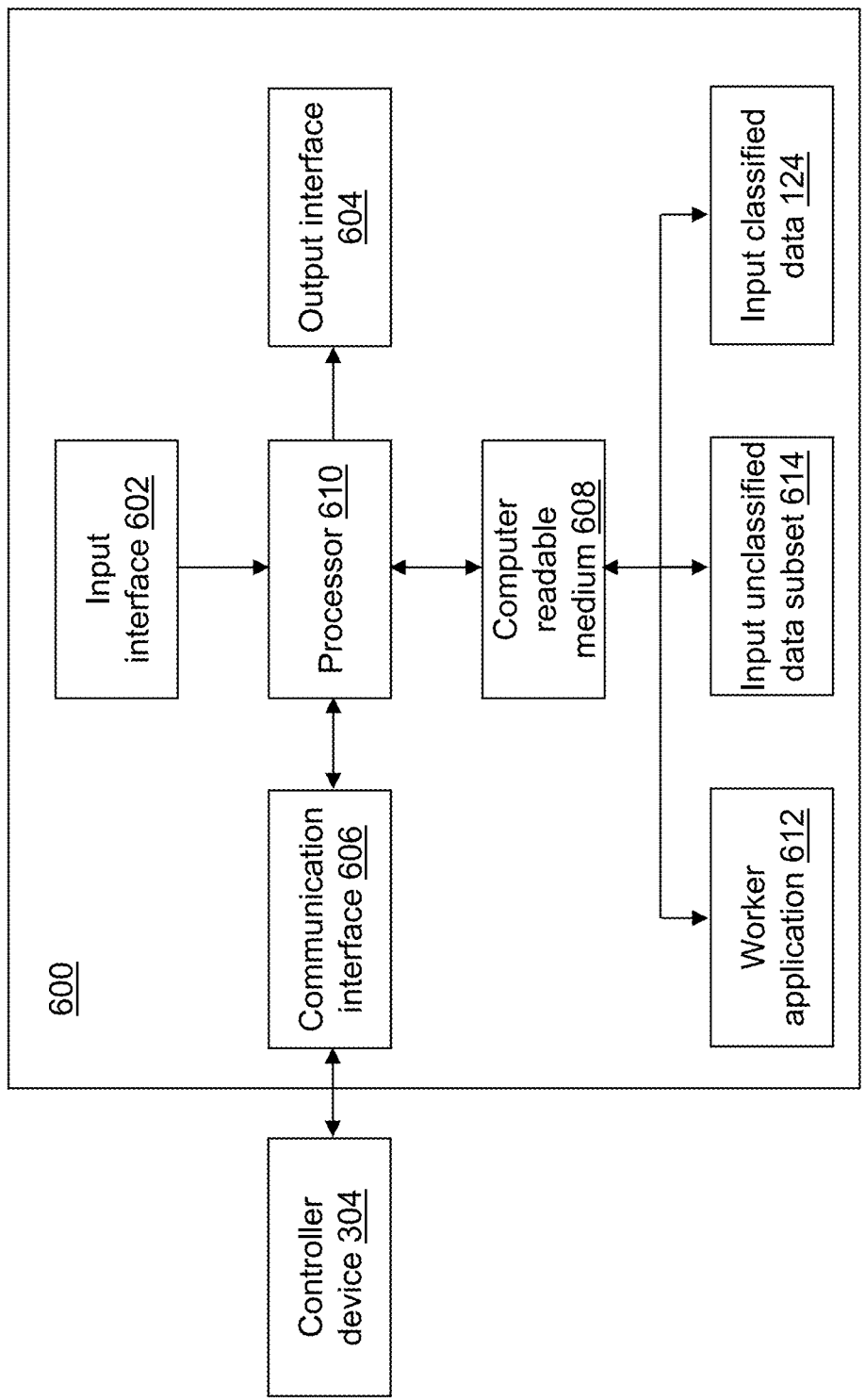
FIG. 6 depicts a block diagram of a worker device of the classification system of FIG. 3 in accordance with an illustrative embodiment.

For illustration, referring to FIG. 6, a block diagram of a worker device 600 is shown in accordance with an example embodiment. Worker device 600 is an example computing device of worker system 306. Worker device 600 may include a fourth input interface 602, a fourth output interface 604, a fourth communication interface 606, a fourth computer-readable medium 608, a fourth processor 610, a worker application 612, input classified data 124, and an input unclassified data subset 614.

In some implementations, a distributed solution allows applications of big data. For example, scalability is provided with a distributed solution. A copy of input classified data 124 may be sent to each computing device of worker system 306. Input unclassified data 126 may be distributed into a unique input unclassified data subset 614 stored at each computing device of worker system 306.

Referring again to FIG. 4, each user device 400 of user system 302 may include the same or different components and combination of components. Fewer, different, and additional components may be incorporated into user device 400. Second input interface 402 provides the same or similar functionality as that described with reference to input interface 102 of classification device 100 though referring to user device 400. Second output interface 404 provides the same or similar functionality as that described with reference to output interface 104 of classification device 100 though referring to user device 400. Second communication interface 406 provides the same or similar functionality as that described with reference to communication interface 106 of classification device 100 though referring to user device 400. Data and messages may be transferred between controller device 304 and user device 400 using second communication interface 406. Second computer-readable medium 408 provides the same or similar functionality as that described with reference to computer-readable medium 108 of classification device 100 though referring to user device 400. Second processor 410 provides the same or similar functionality as that described with reference to processor 110 of classification device 100 though referring to user device 400

Classification application 422 performs operations associated with requesting classification of each observation vector in input unclassified data 126. The operations may be implemented using hardware, firmware, software, or any combination of these methods. Referring to the example embodiment of FIG. 4, classification application 422 is implemented in software (comprised of computer-readable and/or computer-executable instructions) stored in second computer-readable medium 408 and accessible by second processor 410 for execution of the instructions that embody the operations of classification application 422. Classification application 422 may be written using one or more programming languages, assembly languages, scripting languages, etc. Classification application 422 may be implemented as a Web application.

Referring again to FIG. 5, fewer, different, or additional components may be incorporated into controller device 304. Third input interface 502 provides the same or similar functionality as that described with reference to input interface 102 of classification device 100 though referring to controller device 304. Third output interface 504 provides the same or similar functionality as that described with reference to output interface 104 of classification device 100 though referring to controller device 304. Third communication interface 506 provides the same or similar functionality as that described with reference to communication interface 106 of classification device 100 though referring to controller device 304. Data and messages may be transferred between controller device 304 and/or user device 400 and worker device 600 using third communication interface 506. Third computer-readable medium 508 provides the same or similar functionality as that described with reference to computer-readable medium 108 of classification device 100 though referring to controller device 304. Third processor 510 provides the same or similar functionality as that described with reference to processor 110 of classification device 100 though referring to controller device 304.

Controller application 512 performs operations associated with coordinating classification of the observations included in input unclassified data 126 based on inputs provided by user device 400. Controller application 512 requests that the computing devices of worker system 306 generate a trained classification model and classify the observations included in input unclassified data subset 614. The operations may be implemented using hardware, firmware, software, or any combination of these methods. Referring to the example embodiment of FIG. 5, controller application 512 is implemented in software (comprised of computer-readable and/or computer-executable instructions) stored in third computer-readable medium 508 and accessible by third processor 510 for execution of the instructions that embody the operations of controller application 512. Controller application 512 may be written using one or more programming languages, assembly languages, scripting languages, etc. Controller application 512 may be implemented as a Web application.

Referring again to FIG. 6, fewer, different, and additional components may be incorporated into worker device 600. Each worker device 600 may include the same or different components or combination of components.

Fourth input interface 602 provides the same or similar functionality as that described with reference to input interface 102 of classification device 100 though referring to worker device 600. Fourth output interface 604 provides the same or similar functionality as that described with reference to output interface 104 of classification device 100 though referring to worker device 600. Fourth communication interface 606 provides the same or similar functionality as that described with reference to communication interface 106 of classification device 100 though referring to worker device 600. Data and messages may be transferred between worker device 600 and session worker device 620 using fourth communication interface 606. Fourth computer-readable medium 608 provides the same or similar functionality as that described with reference to computer-readable medium 108 of classification device 100 though referring to worker device 600. Fourth processor 610 provides the same or similar functionality as that described with reference to processor 110 of classification device 100 though referring to worker device 600.

Classification application 422, controller application 512, and/or worker application 612, may be the same or different applications that are integrated in various manners. As an example, classification application 422, controller application 512, and/or worker application 612 may be integrated in a single computing device such as classification device 100. Classification application 422, controller application 512, and/or worker application 612 further may be part of an integrated data analytics software application and/or software architecture such as that offered by SAS Institute Inc. of Cary, N.C., USA. For example, classification application 422, controller application 512, and/or worker application 612 may be part of SAS® Enterprise Miner™ and/or SAS® Viya™ developed and provided by SAS Institute Inc. of Cary, N.C., USA that may be used to create highly accurate predictive and descriptive models based on analysis of vast amounts of data from across an enterprise. Merely for further illustration, classification application 422, controller application 512, and/or worker application 612 may be implemented using or integrated with one or more SAS software tools such as Base SAS, SAS/STAT®, SAS® High Performance Analytics Server, SAS® LASR™, SAS® In-Database Products, SAS® Scalable Performance Data Engine, SAS/OR®, SAS/ETS®, SAS® Inventory Optimization, SAS® Inventory Optimization Workbench, SAS® Visual Data Mining and Machine Learning, SAS® Visual Analytics, SAS In-Memory Statistics for Hadoop®, and SAS® Forecast Server, all of which are developed and provided by SAS Institute Inc. of Cary, N.C., USA. Data mining is applicable in a wide variety of industries.

Classification application 422, controller application 512, and/or worker application 612 may be used in a variety of industries. For example, a classification model trained using classification application 422, controller application 512, and/or worker application 612 may be used to recognize text, text meaning, a voice, speech, to recognize characteristics of images such as medical images, equipment diagnostic images, terrain images, etc., to recognize types of web pages, to predict whether or not an event has occurred, such as an equipment failure, to classify a microarray gene expression, etc. Classification application 422, controller application 512, and/or worker application 612 may automatically process data generated as part of operation of an enterprise, facility, system, device, etc., to classify the data and possibly provide a warning or alert associated with the classification using, for example, second input interface 402, second output interface 404, and/or second communication interface 406 so that appropriate action can be initiated in response to the labeling, recognition, or classification. For example, medical images that include a tumor may be recognized in input unclassified data 126 that triggers the sending of a notification message to a clinician that a tumor has been identified based on a "tumor" label determined for the image data.

Figure 7:
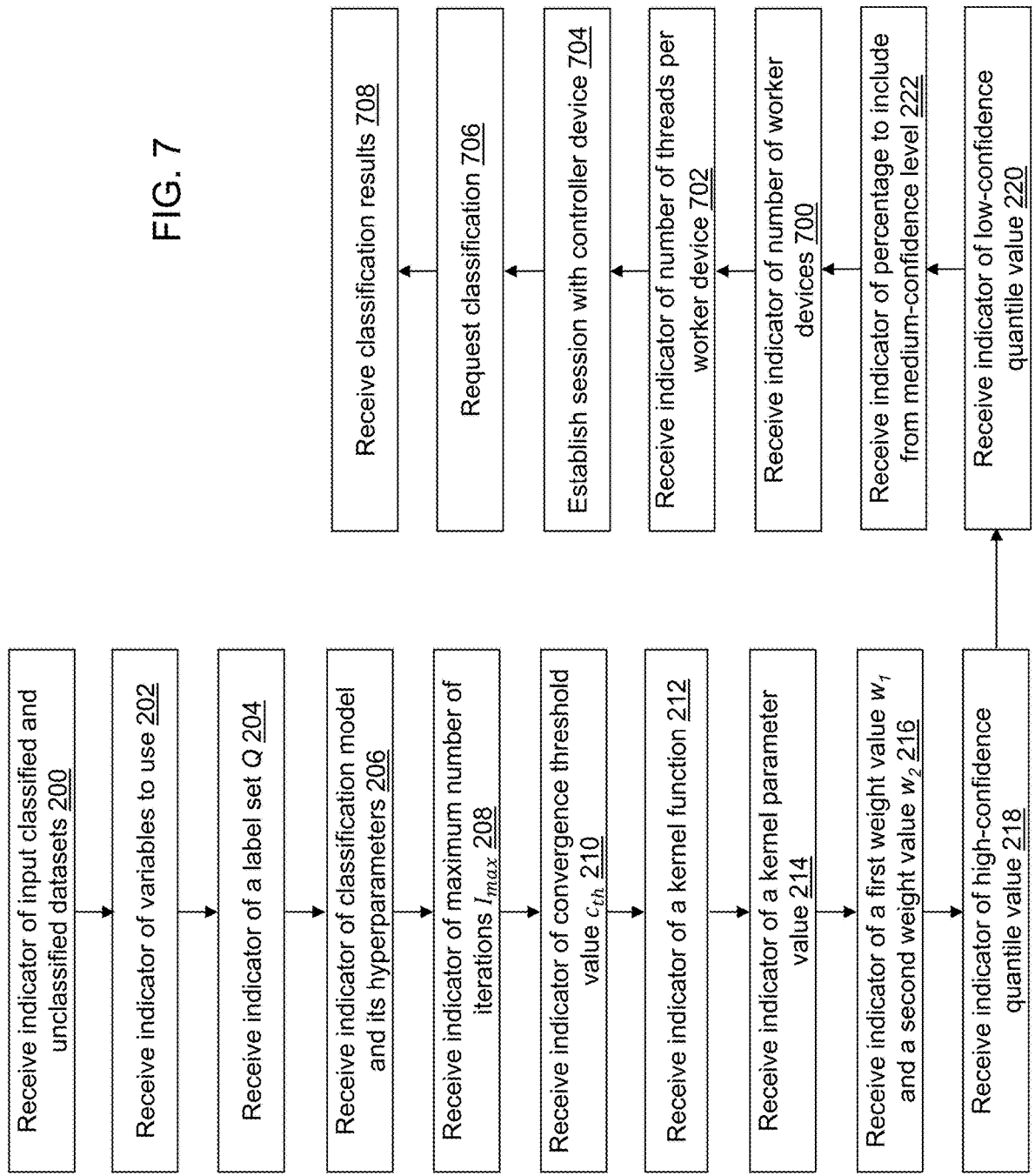
FIG. 7 depicts a flow diagram illustrating examples of operations performed by the user device of FIG. 4 in accordance with an illustrative embodiment.

Referring to FIG. 7, example operations associated with classification application 422 are described. Additional, fewer, or different operations may be performed depending on the embodiment. The order of presentation of the operations of FIG. 7 is not intended to be limiting. A user can interact with one or more user interface windows presented to the user in display 416 under control of classification application 422 independently or through a browser application in an order selectable by the user. Although some of the operational flows are presented in sequence, the various operations may be performed in various repetitions, concurrently, and/or in other orders than those that are illustrated. For example, a user may execute classification application 422, which causes presentation of a first user interface window, which may include a plurality of menus and selectors such as drop-down menus, buttons, text boxes, hyperlinks, etc. associated with classification application 422 as understood by a person of skill in the art.

Operations 200 through 222 described with reference to FIG. 2A may similarly be employed by classification application 422 to define input parameters. For example, values may be received through second input interface 402 from a second keyboard 412 and/or a second mouse 414.

In an operation 700, a thirteenth indicator may be received that indicates a value of $N_w$ the number of computing devices or nodes of worker system 306 that may include controller device 304 (for example, the same or another indicator may indicate whether or not to include controller device 304 or it may or may not be included by default). The value may be automatically determined based on a number of computing devices connected to controller device 304.

In an operation 702, a fourteenth indicator may be received that indicates a number of threads used by each worker computing device.

In an operation 704, a connection is established with controller device 304. User device 400 accepts commands from a user and relays necessary instructions to controller device 304. The input parameters that may include the parameters indicated in operations 700 and 702 and 200 through 222 are made available to controller device 304. For example, the values of any of the parameters that are not default values may be sent to controller device 304. As another option, a location of the values of any of the parameters that are not default values may be sent to controller device 304. As still another option, a location of the values of any of the parameters that are not default values may be provided to controller device 304 in a computer memory location that is known to controller device 304.

In an operation 706, a classification is requested of controller device 304 using the input parameters.

In an operation 708, classification results are accessed. For example, an indicator may be received that indicates that the classification process is complete. For example, one or more output tables may be presented on second display 416, and/or printed on a second printer 420 when the classification process is complete. As another option, second display 416 may present a statement indicating that the classification process and/or a second speaker 418 may play a sound indicating that the classification process is complete. The user can access the output tables in the specified location.

Referring to FIG. 8, example operations associated with controller application 512 are described. Additional, fewer, or different operations may be performed depending on the embodiment. The order of presentation of the operations of FIG. 8 is not intended to be limiting. Controller device 304 establishes communication with the computing devices of worker system 306, sends instructions to each worker device 600, collects and aggregates the results of computations from each worker device 600, and communicates final results to user device 400. Controller device 304 may utilize itself as a worker computing device of worker system 306. The computing devices of worker system 306 receive instructions from controller device 304, store and process data, and send the results of computations back to controller device 304.

In an operation 800, the classification request is received and the input parameters obtained by classification application 422 are accessed.

In an operation 802, input classified data 124 is sent or otherwise provided to each worker device 600 and/or worker thread.

In an operation 804, a non-overlapping portion of input unclassified data 126 is sent or otherwise provided to each worker device 600 and/or worker thread.

In an operation 806, a classification request is sent to each worker/thread.

In an operation 808, a completion confirmation is received from each worker/thread.

In an operation 810, the classification information is combined to define a classification for each unclassified observation.

In an operation 812, the class or label identified for each observation vector $x_i$ included in input unclassified data 126 may be stored in classification output data 128 possibly with the respective observation vector $x_i$. An indicator that processing is complete may be returned to user device 400.

Figure 9A:
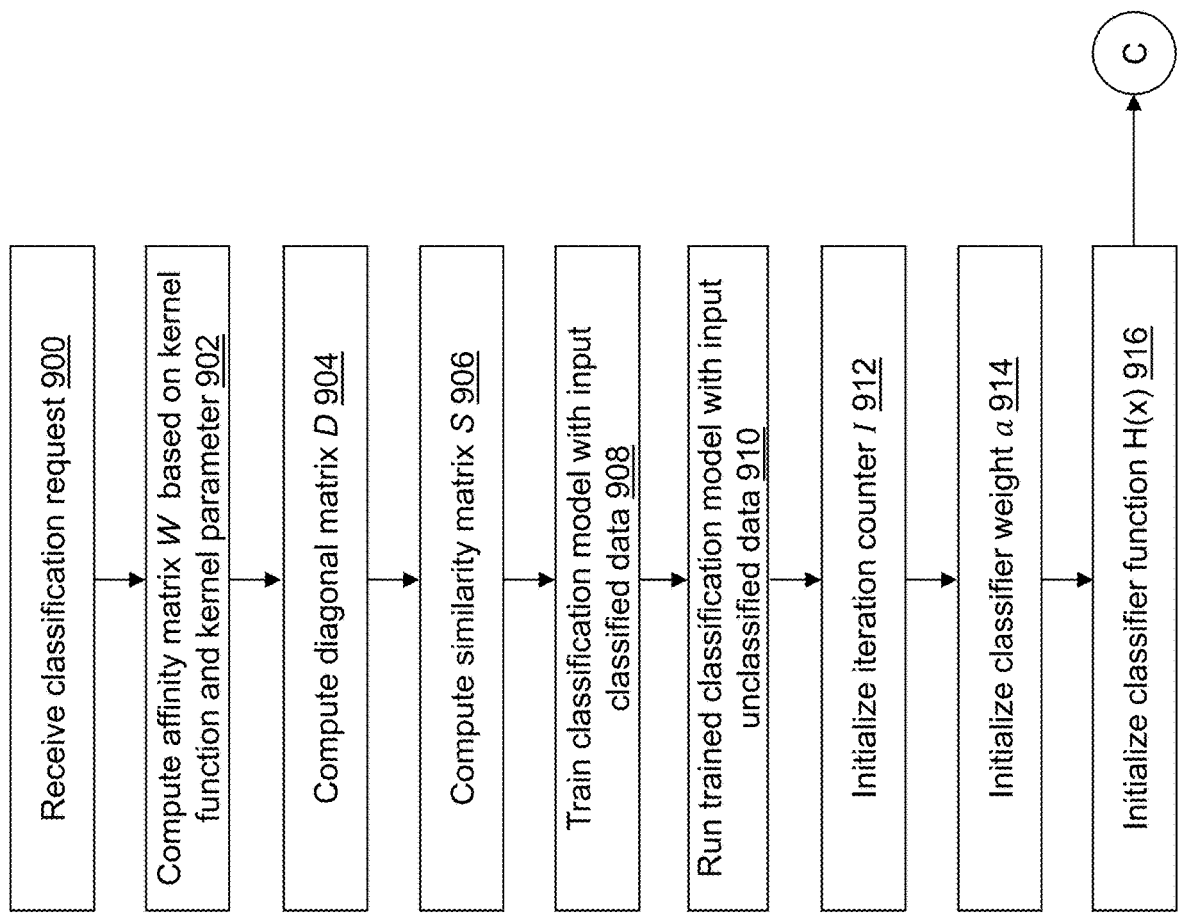
FIGS. 9A to 9C depict a flow diagram illustrating examples of operations performed by the worker device of FIG. 6 in accordance with an illustrative embodiment.

Referring to FIG. 9, example operations associated with worker application 612 that are performed by worker device 600 are described. Additional, fewer, or different operations may be performed depending on the embodiment. The order of presentation of the operations of FIG. 9 is not intended to be limiting.

In an operation 900, a classification request is received from controller device 304. The data describing the process is accessed or otherwise received.

Similar to operation 224, in an operation 902, an affinity matrix W is computed based on the kernel function and the kernel parameter value provided for input classified data 124 and input unclassified data subset 614 or input unclassified data subset 514.

Similar to operation 226, in an operation 904, a diagonal matrix D is computed based on the affinity matrix W.

Similar to operation 228, in an operation 906, a similarity matrix S is computed based on the affinity matrix W and the diagonal matrix D.

Similar to operation 230, in an operation 908, the classification model is trained using the observation vectors stored in input classified data 124 and the hyperparameters provided.

Similar to operation 232, in an operation 910, the trained classification model is executed with input unclassified data subset 614 or input unclassified data subset 514 to compute the probability $d_i$, to determine the label $y_i$, and to initialize the similarity values.

Similar to operation 234, in an operation 912, an iteration counter I is initialized, for example, as I=2.

Similar to operation 236, in an operation 914, a classifier weight is initialized, for example, using $$\alpha_1 = \frac{1}{4}\ln\frac{\sum_{i=1}^{N_u} p_i\delta(h(x_i), 1) + \sum_{i=1}^{N_u} q_i\delta(h(x_i), -1)}{\sum_{i=1}^{N_u} p_i\delta(h(x_i), -1) + \sum_{i=1}^{N_u} q_i\delta(h(x_i), 1)},$$

for a binary classifier with label options of 1 and −1, where $N_u$ is a number of observations included in input unclassified data subset 614 or input unclassified data subset 514.

Figure 9B:
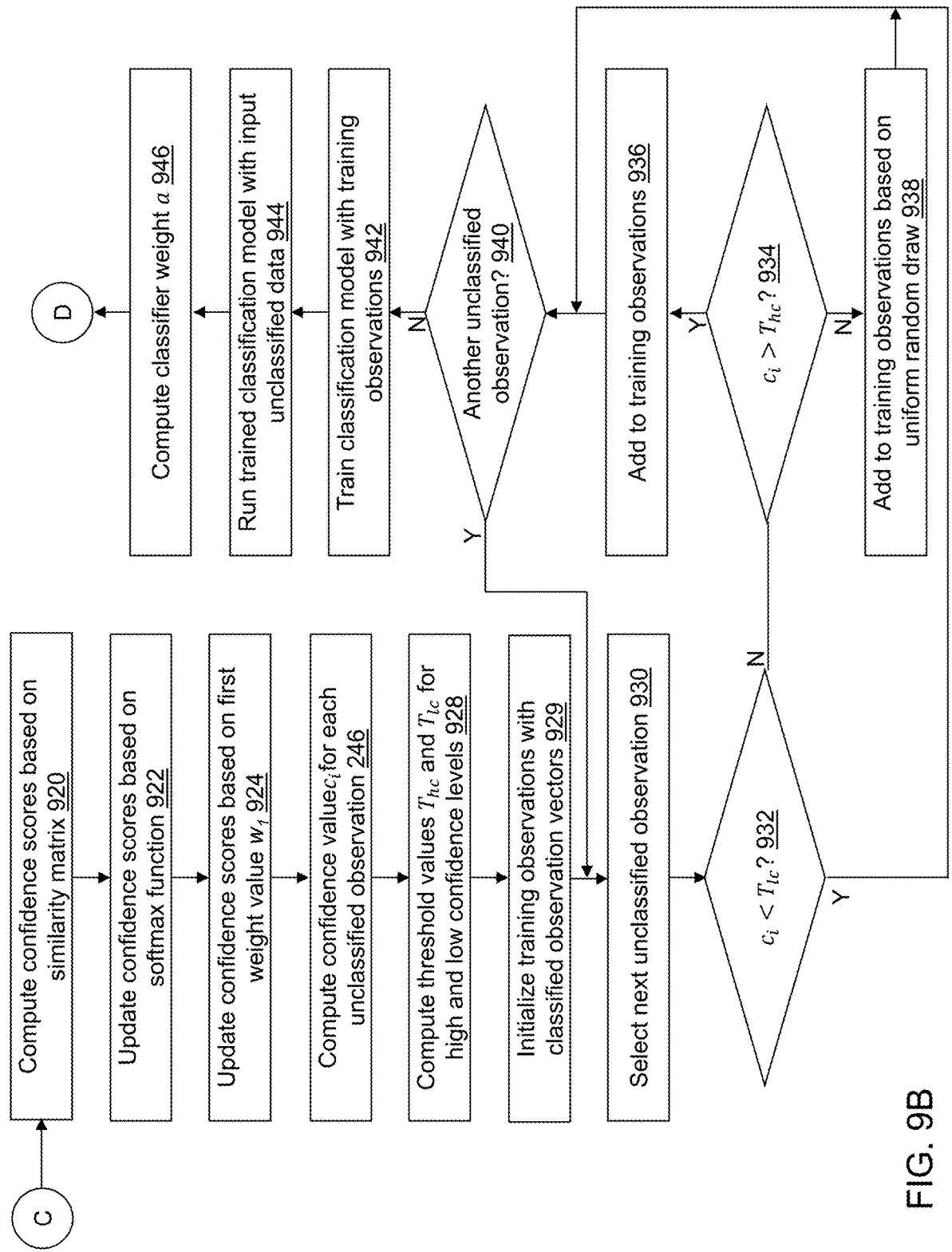
Figure 9C:
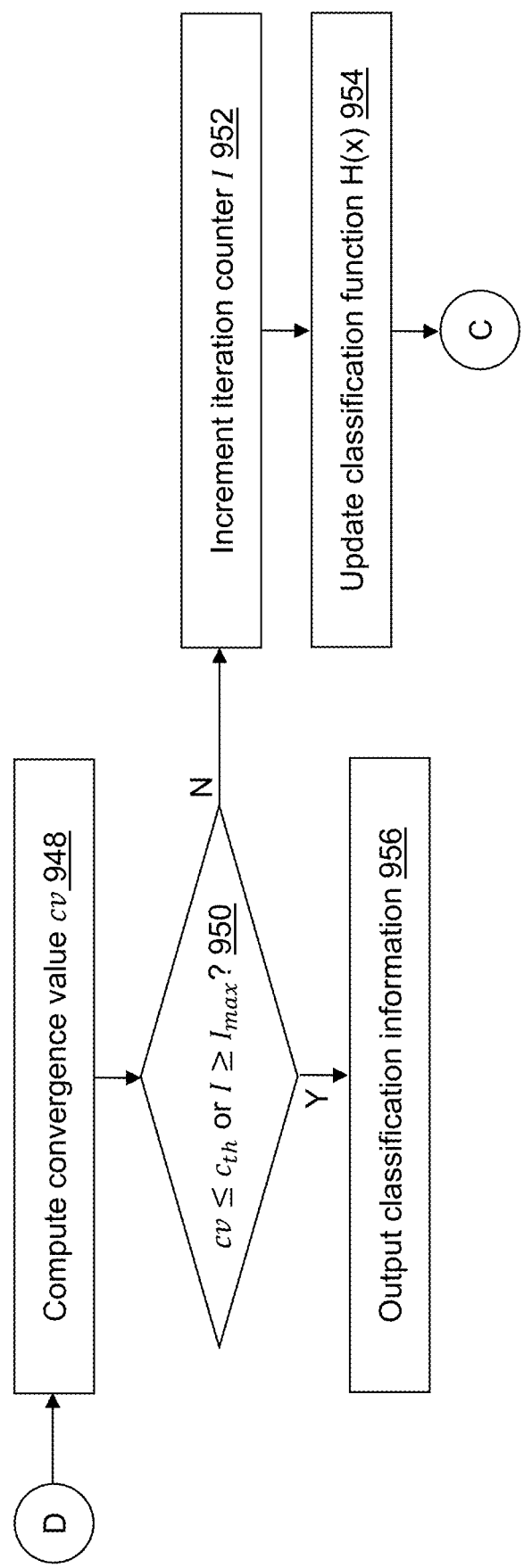

Similar to operation 238, in an operation 916, a classifier function H(X) is initialized, for example, using $H(x_i)=\alpha_1 h(x_i)$, and processing continues in an operation 920 shown referring to FIG. 9B.

Similar to operation 240, in an operation 920, a similarity value is computed for each observation vector of the plurality of unclassified observation vectors included in input unclassified data subset 614 or input unclassified data subset 514 and for each permissible label value using the similarity matrix.

Similar to operation 242, in an operation 922, the similarity values for each observation vector of the plurality of unclassified observation vectors included in input unclassified data subset 614 or input unclassified data subset 514 are updated based on the softmax function.

Similar to operation 244, in an operation 924, the similarity values for each observation vector of the plurality of unclassified observation vectors included in input unclassified data subset 614 or input unclassified data subset 514 are further updated using $d_i$ and $w_2$.

Similar to operation 246, in an operation 926, the confidence value $c_i$ is computed for each observation vector of input unclassified data subset 614 or input unclassified data subset 514.

Similar to operation 248, in an operation 928, a high-confidence threshold $T_{hc}$ and a low-confidence threshold $T_{lc}$ are computed.

Similar to operation 249, in an operation 929, training observations are initialized with the plurality of classified observation vectors.

Similar to operation 250, in an operation 930, an $i^{th}$ observation vector is selected from the plurality of unclassified observation vectors included in input unclassified data subset 614 or input unclassified data subset 514.

Similar to operation 252, in an operation 932, a determination is made concerning whether $c_i<T_{lc}$ indicating that a confidence in the label assignment is low. When $c_i<T_{lc}$, processing continues in an operation 940 such that the $i^{th}$ observation vector is not added to the training observations. When $c_i \geq T_{lc}$, processing continues in an operation 934.

Similar to operation 254, in operation 934, a determination is made concerning whether $c_i>T_{hc}$ indicating that a confidence in the label assignment is high. When $c_i>T_{hc}$, processing continues in an operation 936. When $c_i \leq T_{hc}$, processing continues in an operation 938.

Similar to operation 256, in operation 936, the $i^{th}$ observation vector is added to the training observations because confidence in the label assignment is high (exceeds $T_{hc}$).

Similar to operation 258, in operation 938, the $i^{th}$ observation vector is added to the training observations when a random draw from a uniform distribution is less than the inclusion percentage value to include from the medium-confidence level.

Similar to operation 260, in operation 940, a determination is made concerning whether there is another unclassified observation included in input unclassified data subset 614 or input unclassified data subset 514. When there is another unclassified observation, processing continues in operation 930 to select a next observation vector. When there is not another unclassified observation, processing continues in an operation 942.

Similar to operation 262, in operation 942, the classification model is trained using the training observations and the hyperparameters provided.

Similar to operation 264, in an operation 944, the trained classification model is executed with the plurality of unclassified observation vectors to define a probability $d_i$ of a label assignment to each observation vector of the plurality of unclassified observation vectors, and a label $y_i$ predicted for each observation vector of the plurality of unclassified observation vectors.

Similar to operation 266, in an operation 946, a classifier weight is computed, for example, using $$\alpha_I = \frac{1}{4}\ln\frac{\sum_{i=1}^{N_u} p_i\delta(h(x_i), 1) + \sum_{i=1}^{N_u} q_i\delta(h(x_i), -1)}{\sum_{i=1}^{N_u} p_i\delta(h(x_i), -1) + \sum_{i=1}^{N_u} q_i\delta(h(x_i), 1)},$$

for a binary classifier with label options of 1 and −1. Processing continues in an operation 948 shown referring to FIG. 9C.

Similar to operation 268, in an operation 948, a convergence value cv is computed, for example, using cv=abs($\alpha_I - \alpha_{I-1}$).

Similar to operation 270, in an operation 950, a determination is made concerning whether convergence has been achieved or the maximum number of iterations have been performed. If $cv \le c_{th}$ or $I \ge I_{max}$, processing continues in an operation 956. If $cv > c_{th}$ and $I < I_{max}$, processing continues in an operation 952.

Similar to operation 272, in operation 952, the iteration counter I is incremented, for example, as I=I+1.

Similar to operation 274, in an operation 954, the classifier function H(X) is updated, for example, using $H(x_i)=H(x_i)+\alpha_j h(x_i)$, and processing continues in operation 920.

Similar to operation 276, in operation 956, the class or label identified for each observation vector $x_i$ included in input unclassified data subset 614 or input unclassified data subset 514 may be output to controller device 304. A completion indicator may be sent to controller device 304 that classification processing of the input unclassified data subset 614 or input unclassified data subset 514 is complete.

Figure 10:
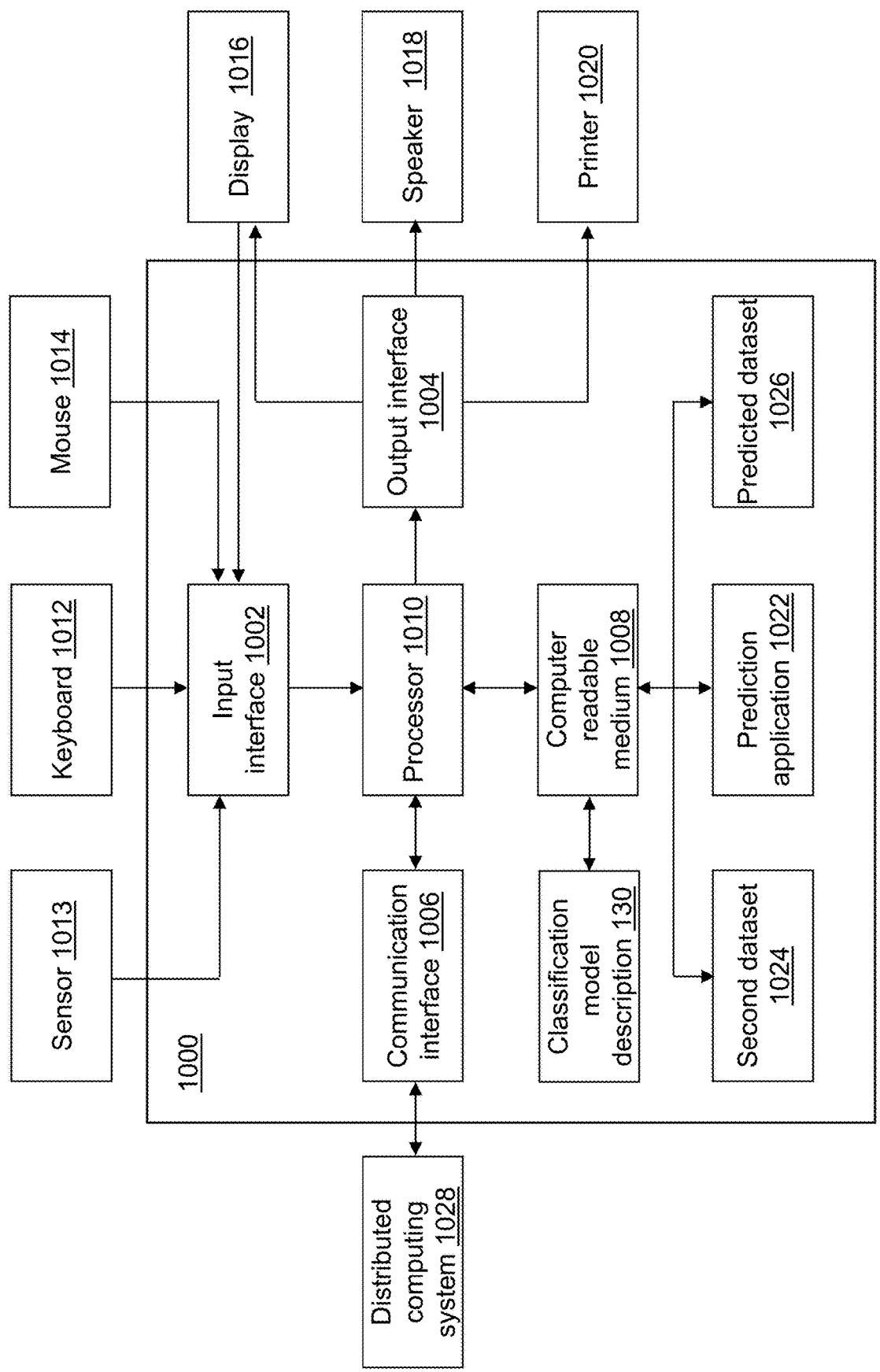
FIG. 10 depicts a block diagram of a prediction device that uses a trained classification model to predict a label or class in accordance with an illustrative embodiment.

Referring to FIG. 10, a block diagram of a prediction device 1000 is shown in accordance with an illustrative embodiment. Prediction device 1000 may include a fifth input interface 1002, a fifth output interface 1004, a fifth communication interface 1006, a fifth non-transitory computer-readable medium 1008, a fifth processor 1010, a predictive application 1022, classification model description 130, a second dataset 1024, and predicted dataset 1026. Fewer, different, and/or additional components may be incorporated into prediction device 1000. Prediction device 1000 and classification device 100 may be the same or different devices.

Fifth input interface 1002 provides the same or similar functionality as that described with reference to input interface 102 of classification device 100 though referring to prediction device 1000. Fifth output interface 1004 provides the same or similar functionality as that described with reference to output interface 104 of classification device 100 though referring to prediction device 1000. Fifth communication interface 1006 provides the same or similar functionality as that described with reference to communication interface 106 of classification device 100 though referring to prediction device 1000. Data and messages may be transferred between prediction device 1000 and distributed computing system 1028 using fifth communication interface 1006. Fifth computer-readable medium 1008 provides the same or similar functionality as that described with reference to computer-readable medium 108 of classification device 100 though referring to prediction device 1000. Fifth processor 1010 provides the same or similar functionality as that described with reference to processor 110 of classification device 100 though referring to prediction device 1000.

Predictive application 1022 performs operations associated with predicting values for the response variable using classification model description 130 based on values for the observations stored in second dataset 1024 or received in an event stream. Dependent on the type of data stored in input classified data 124 and second dataset 1024, predictive application 1022 may identify anomalies as part of process control, for example, of a manufacturing process, classify images, for example, those produced by an electro-cardiogram device, identify a fraudulent transaction, identify a health alert, for example, of a patient using health sensors, identify a cybersecurity attack using network traffic, etc. Some or all of the operations described herein may be embodied in predictive application 1022. The operations may be implemented using hardware, firmware, software, or any combination of these methods.

Referring to the example embodiment of FIG. 10, predictive application 1022 is implemented in software (comprised of computer-readable and/or computer-executable instructions) stored in fifth computer-readable medium 1008 and accessible by fifth processor 1010 for execution of the instructions that embody the operations of predictive application 1022. Predictive application 1022 may be written using one or more programming languages, assembly languages, scripting languages, etc. Predictive application 1022 may be integrated with other analytic tools. For example, predictive application 1022 may be implemented using or integrated with one or more SAS software tools such as JMP, Base SAS, SAS/STAT, of SAS Enterprise Miner SAS® High Performance Analytics Server, SAS LASR, SAS In-Database Products, SAS Scalable Performance Data Engine, SAS/OR, SAS/ETS, SAS Inventory Optimization, SAS Inventory Optimization Workbench, SAS Visual Analytics, SAS Viya, SAS In-Memory Statistics for Hadoop, and SAS Forecast Server, all of which are developed and provided by SAS Institute Inc. of Cary, N.C., USA. One or more operations of predictive application 1022 further may be performed by an ESPE. Predictive application 1022 and classification application 122 further may be integrated applications.

Predictive application 1022 may be implemented as a Web application. Predictive application 1022 may be integrated with other system processing tools to automatically process data generated as part of operation of an enterprise using fifth input interface 1002, fifth output interface 1004, and/or fifth communication interface 1006 so that appropriate action can be initiated in response. For example, a warning or an alert may be presented using a third display 1016, a third speaker 1018, a third printer 1020, etc. or sent to one or more computer-readable media, display, speaker, printer, etc. of distributed computing system 1028 based on predicted values for the response variable.

Input classified data 124 and second dataset 1024 may be generated, stored, and accessed using the same or different mechanisms. Similar to input classified data 124, second dataset 1024 may include a plurality of rows and a plurality of columns with the plurality of rows referred to as observation vectors or records, and the columns referred to as variables that are associated with an observation. Second dataset 1024 may be transposed.

Similar to input classified data 124, second dataset 1024 may be stored on fifth computer-readable medium 1008 or on one or more computer-readable media of distributed computing system 1028 and accessed by prediction device 1000 using fifth communication interface 1006. Data stored in second dataset 1024 may be a sensor measurement or a data communication value, for example, from a sensor 1013, may be generated or captured in response to occurrence of an event or a transaction, generated by a device such as in response to an interaction by a user with the device, for example, from a third keyboard 1012 or a third mouse 1014, etc. The data stored in second dataset 1024 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. The data stored in second dataset 1024 may be captured at different time points periodically, intermittently, when an event occurs, etc. One or more columns may include a time value. Similar to input classified data 124, data stored in second dataset 1024 may be generated as part of the IoT, and some or all data may be pre- or post-processed by an ESPE.

Similar to input classified data 124, second dataset 1024 may be stored in various compressed formats such as a coordinate format, a compressed sparse column format, a compressed sparse row format, etc. Second dataset 1024 further may be stored using various structures as known to those skilled in the art including a file system, a relational database, a system of tables, a structured query language database, etc. on classification device 100, on prediction device 1000, and/or on distributed computing system 1028. Prediction device 1000 and/or distributed computing system 1028 may coordinate access to second dataset 1024 that is distributed across a plurality of computing devices. For example, second dataset 1024 may be stored in a cube distributed across a grid of computers as understood by a person of skill in the art. As another example, second dataset 1024 may be stored in a multi-node Hadoop cluster. As another example, second dataset 1024 may be stored in a cloud of computers and accessed using cloud computing technologies, as understood by a person of skill in the art. The SAS LASR Analytic Server and/or SAS Viya may be used as an analytic platform to enable multiple users to concurrently access data stored in second dataset 1024.

Figure 11:
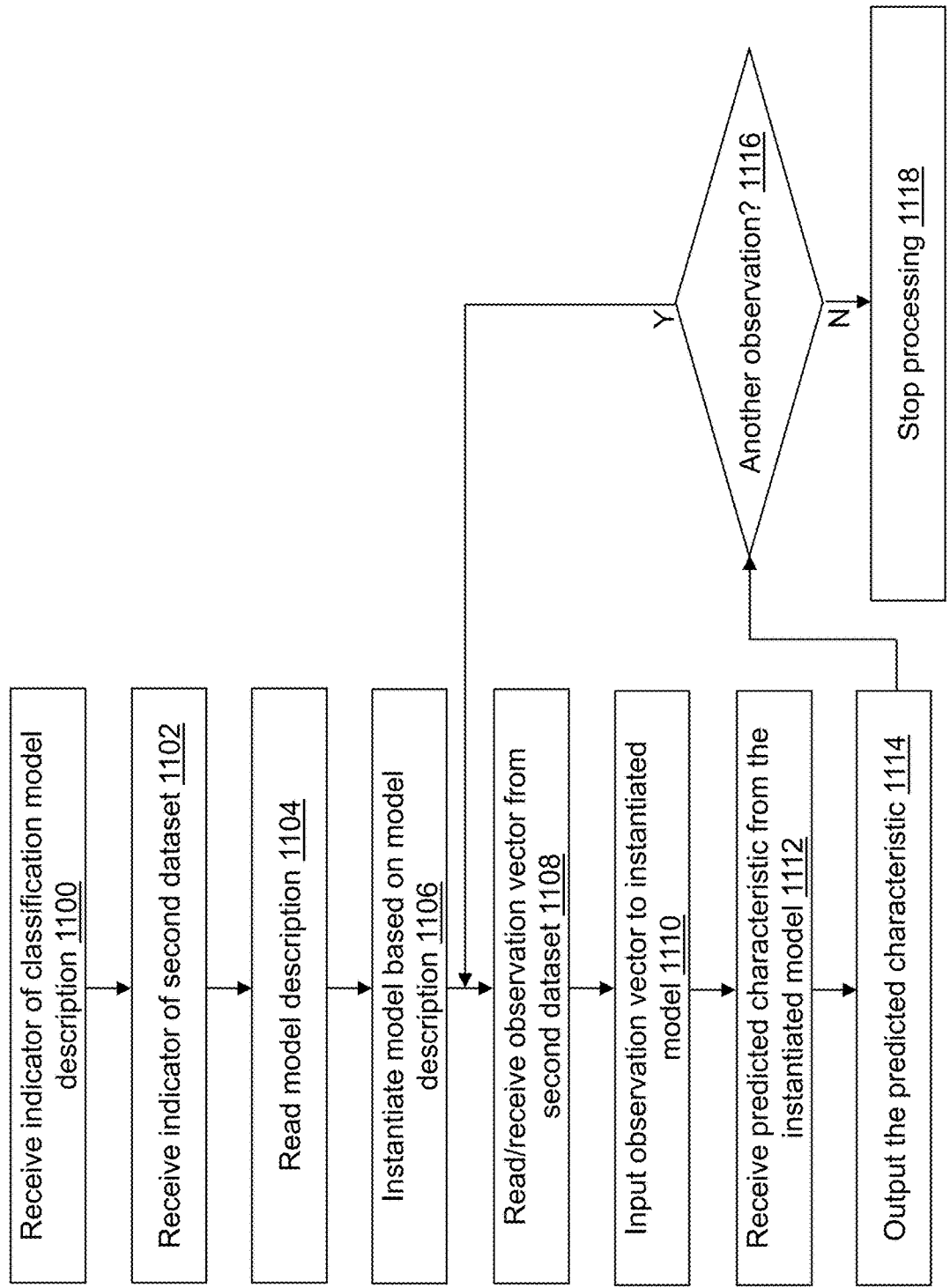
FIG. 11 depicts a flow diagram illustrating examples of operations performed by the prediction device of FIG. 10 in accordance with an illustrative embodiment.

Referring to FIG. 11, example operations of predictive application 1022 are described. Additional, fewer, or different operations may be performed depending on the embodiment of predictive application 1022. The order of presentation of the operations of FIG. 11 is not intended to be limiting. Although some of the operational flows are presented in sequence, the various operations may be performed in various repetitions, concurrently (in parallel, for example, using threads and/or a distributed computing system), and/or in other orders than those that are illustrated.

In an operation 1100, a fifteenth indicator may be received that indicates classification model description 130. For example, the fifteenth indicator indicates a location and a name of classification model description 130. As an example, the fifteenth indicator may be received by predictive application 1022 after training from a user interface window or after entry by a user into a user interface window. In an alternative embodiment, classification model description 130 may not be selectable. For example, a most recently created classification model description may be used automatically.

In an operation 1102, a sixteenth indicator may be received that indicates second dataset 1024. For example, the sixteenth indicator indicates a location and a name of second dataset 1024. As an example, the sixteenth indicator may be received by predictive application 1022 after training from a user interface window or after entry by a user into a user interface window. In an alternative embodiment, second dataset 1024 may not be selectable. For example, a most recently created dataset may be used automatically.

In an operation 1104, the classification model description is read.

In an operation 1106, a predictive model is instantiated based on the classification model description read from classification model description 130. For example, a gradient boosting tree model may be instantiated using the ASTORE procedure, for example, as described in U.S. Pat. No. 9,619,491.

In an operation 1108, value(s) x that define a new observation vector are read from a next line of second dataset 1024 or received from an ESPE.

In an operation 1110, the new observation vector is input to the instantiated classification model that determines a predicted value y for the new observation vector.

In an operation 1112, the predicted value y for the new observation vector is received from the instantiated classification model.

In an operation 1114, the predicted value y for the new observation vector is output to predicted dataset 1026. The read value(s) x and/or other values read from second dataset 1024 further may be output to predicted dataset 1026. The predicted value y may be output using a third display 1016, a third speaker 1018, a third printer 1020, or may be output to another device using distributed computing system 1028. For example, an alert message may be sent to a smart phone.

In an operation 1116, a determination is made concerning whether there is another observation vector to process. When there is another observation vector to process, processing continues in operation 1108. When there is not another observation vector to process, processing continues in an operation 1118 or in operation 1108 to wait for receipt of another observation vector, for example, from an ESPE.

In operation 1118, processing is done.

Supervised learning requires that the target (dependent) variable y be classified or labeled in training data so that a model can be built to predict the class for new unclassified data. Currently, supervised learning systems discard observations in the training data that are not labeled. While supervised learning algorithms are typically better predictors/classifiers, labeling training data often requires a physical experiment or a statistical trial, and human labor is usually required. As a result, it may be very complex and expensive to fully label an entire training dataset of sufficient size to develop an accurate predictive model. Distributed classification system 300 and classification device 100 solve this problem by providing a cost effective, accurate, and fast process for classifying unclassified data.

Classification application 122 was evaluated using a first dataset, the Kaggle breast cancer dataset, that included 455 training samples and 114 test samples for binary classification. The type of classification model was the gradient boosting tree model type. There were 30 numerical features in the dataset. Input unclassified data 126 was created by randomly masking from 10 percent to 90 percent of the observations at 10 percent intervals. Classification application 122 was compared to a first existing classification method, the open source Lightgbm package in python that is available from GitHub, Inc. The values of the hyperparameters were high-confidence quantile value equal to 95%, low-confidence quantile value equal to 90%, number of iterations $I_{max}=20$, and the first weight value $w_1=12$. The second weight value $w_2$ was defined such that $$\frac{N_u}{N_C} > 0.5,$$

$w_2=0.1$; whereas, when $$\frac{N_u}{N_C} < 0.1,$$

$w_2=0.5$. When $$0.5 \geq \frac{N_u}{N_C} \geq 0.1,$$

a grid search was performed with values between $w_2=0.1$ and $w_2=0.5$ with a grid step size of 0.02. The value of $w_2$ between $w_2=0.1$ and $w_2=0.5$ that resulted in the best performance was reported in the results. Since in general gradient boosting tree models improve with more classified data, the value of $w_2$ can be decreased as the proportion of classified data increases.

Figure 12:
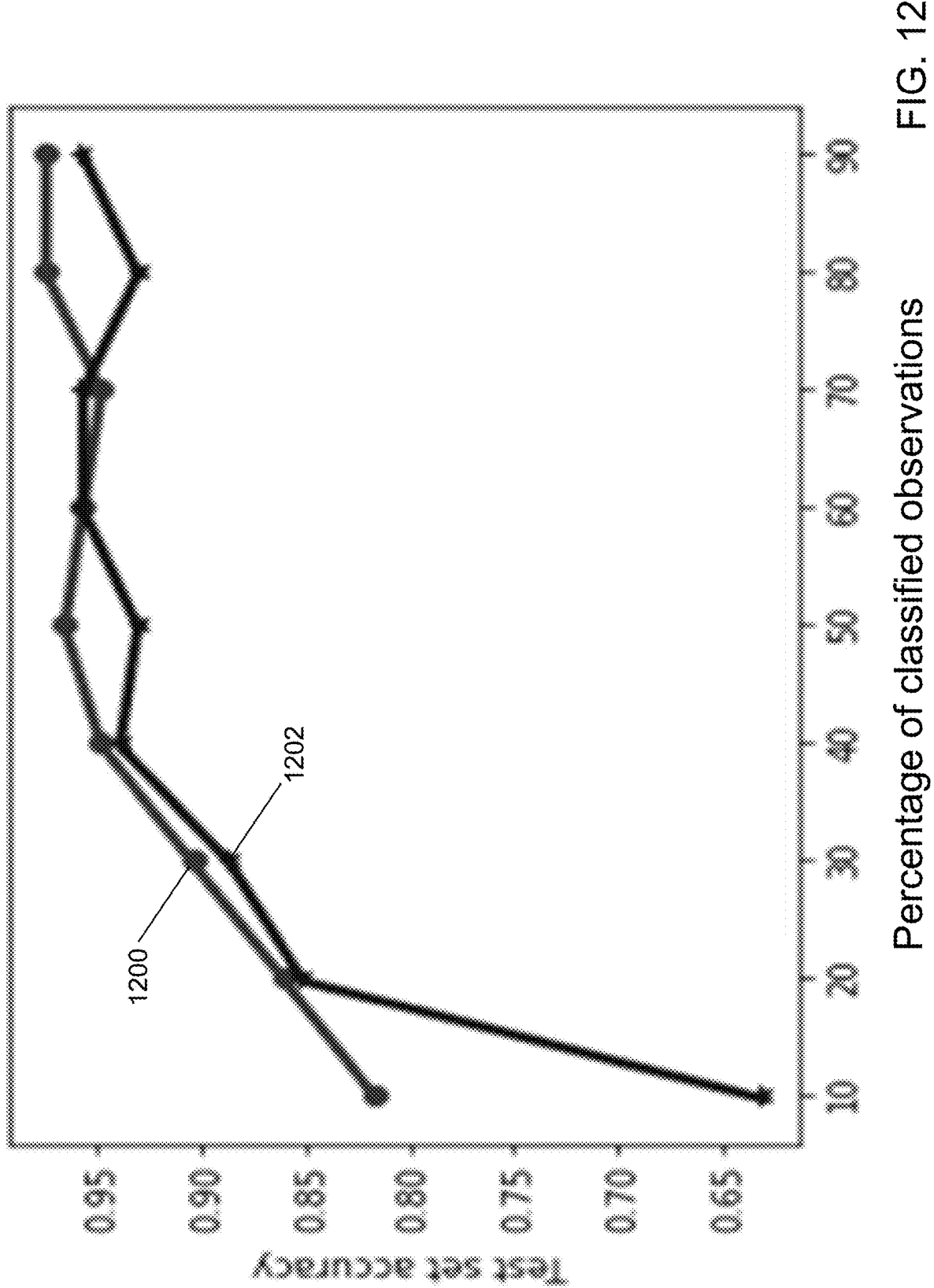
FIG. 12 shows a first graph of accuracy values for a first dataset as a function of a percentage of classified observations using a preexisting supervised classification method and using the classification application of FIGS. 2A, 2B, and 2C in accordance with an illustrative embodiment.

Referring to FIG. 12, a first graph of accuracy values for the first dataset as a function of a percentage of classified observations used is shown in accordance with an illustrative embodiment. A first accuracy curve 1200 shows the accuracy that results using classification application 122 with classified and unclassified observations drawn from the first dataset. A second accuracy curve 1202 shows the accuracy that results using the Lightgbm package with only the referenced percentage of classified observations drawn from the first dataset. Classification application 122 results in significantly better accuracy particularly at classified observation percentages below 20% mainly due to the exploitation of the unclassified data that trains a more discriminative classifier. Table 1 below summarizes the results for classified observation percentages below 20%.

TABLE 1

| % classified data | Classification application 122 | Lightgbm |
|---|---|---|
| 0.1 | 0.81 | 0.65 |
| 0.12 | 0.82 | 0.67 |
| 0.14 | 0.83 | 0.72 |
| 0.16 | 0.84 | 0.75 |
| 0.18 | 0.86 | 0.81 |

Classification application 122 was also evaluated using a second dataset, the HMEQ dataset for binary classification. There were 200 classified observations and 3300 unclassified observations with 6 dimensional features. The values of the hyperparameters were high-confidence quantile value equal to 95%, low-confidence quantile value equal to 90%, number of iterations $I_{max}=20$, and the first weight value $w_1=12$. The second weight value $w_2$ was tuned and the best performance is shown in FIG. 13.

Figure 13:
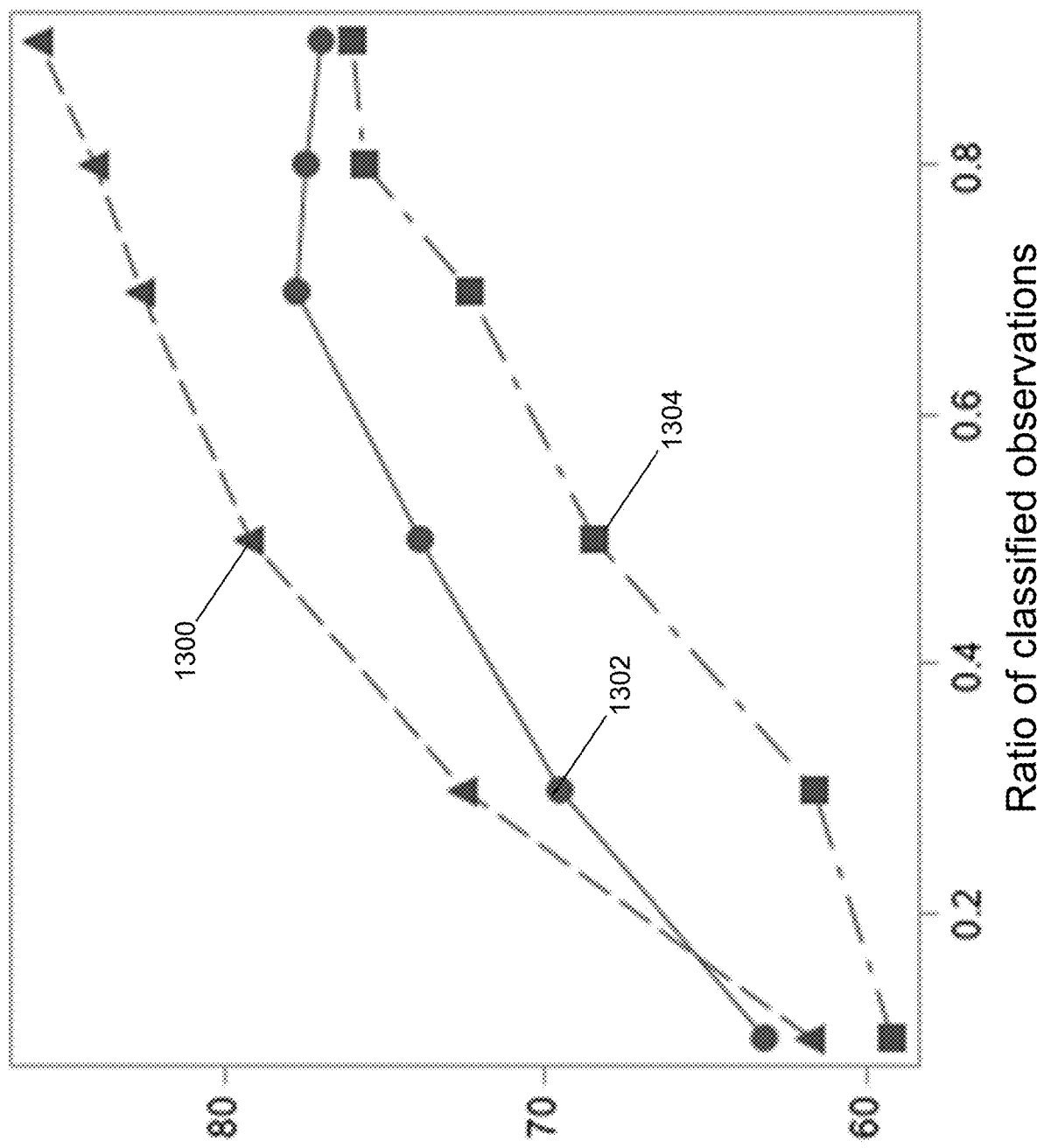
FIG. 13 shows a second graph of accuracy values for a second dataset as a function of the percentage of classified observations using the preexisting supervised classification method, using a preexisting semi-supervised classification method, and using the classification application of FIGS. 2A, 2B, and 2C in accordance with an illustrative embodiment.

Referring to FIG. 13, a second graph of accuracy values for the second is shown in accordance with an illustrative embodiment. A first accuracy curve 1300 shows the accuracy that results using classification application 122 with classified and unclassified observations drawn from the second dataset. A second accuracy curve 1302 shows the accuracy that results using the action set tkssl in SAS Viya with classified and unclassified observations drawn from the second dataset. A third accuracy curve 1304 shows the accuracy that results using the Lightgbm package with only the referenced percentage of classified observations drawn from the second dataset. Classification application 122 results in significantly better accuracy at classified observation percentages above 5% mainly due to the exploitation of the unclassified data that trains a more discriminative classifier but also due to the improved similarity value computation. Table 2 below summarizes the results.

TABLE 2

| % classified data | Classification application 122 | tkssl | Lightgbm |
|---|---|---|---|
| 0.1 | 0.62 | 0.62 | 0.59 |
| 0.2 | 0.65 | 0.64 | 0.60 |
| 0.3 | 0.72 | 0.68 | 0.62 |
| 0.4 | 0.73 | 0.7 | 0.63 |
| 0.5 | 0.79 | 0.73 | 0.66 |
| 0.6 | 0.81 | 0.74 | 0.69 |
| 0.7 | 0.83 | 0.78 | 0.72 |
| 0.8 | 0.84 | 0.77 | 0.73 |
| 0.9 | 0.87 | 0.76 | 0.73 |

Classification application 122 can greatly improve the model accuracy for streaming models where new data is typically a small percent of the dataset and sometimes labels are not available. The explosion of digital data is generating many opportunities for big data analytics, which in turn provides many opportunities for tuning classification models to capitalize on the information contained in the data—to make better predictions that lead to better decisions.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise. The illustrative embodiments may be implemented as a method, apparatus, or article of manufacture using standard programming and/or engineering techniques to produce software, firmware, hardware, or any combination thereof to control a computer to implement the disclosed embodiments.

The foregoing description of illustrative embodiments of the disclosed subject matter has been presented for purposes of illustration and of description. It is not intended to be exhaustive or to limit the disclosed subject matter to the precise form disclosed, and modifications and variations are permissible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:
   compute a similarity matrix using a kernel function with a plurality of observation vectors, wherein the plurality of observation vectors includes a plurality of unclassified observation vectors and a plurality of classified observation vectors, wherein a target variable value is defined to represent a label for each respective observation vector of the plurality of classified observation vectors, wherein the target variable value is not defined to represent the label for each respective observation vector of the plurality of unclassified observation vectors;
   train a classification model with the plurality of classified observation vectors;
   execute the trained classification model with the plurality of unclassified observation vectors to determine a probability of a label assignment to each observation vector of the plurality of unclassified observation vectors and to predict the target variable value for each observation vector of the plurality of unclassified observation vectors;
(A) compute similarity values for each observation vector of the plurality of unclassified observation vectors and for each permissible unique target variable value using a classification function and the computed similarity matrix;
(B) compute a confidence value for each observation vector of the plurality of unclassified observation vectors using the computed similarity values for each respective observation vector of the plurality of unclassified observation vectors;
(C) compute a high-confidence threshold value from confidence values computed in (B) for the plurality of unclassified observation vectors;
(D) compute a low-confidence threshold value from the confidence values computed in (B);
(E) initialize a training dataset with each observation vector of the plurality of classified observation vectors;
(F) for each observation vector of the plurality of unclassified observation vectors,
when the confidence value for a respective observation vector of the plurality of unclassified observation vectors is greater than the computed high-confidence threshold value, add the respective observation vector to the training dataset; and
when the confidence value for a respective observation vector of the plurality of unclassified observation vectors is greater than the computed low-confidence threshold value and less than the computed high-confidence threshold value, add the respective observation vector to the training dataset based on a comparison between a random value drawn from a uniform distribution and a predefined inclusion percentage value;
(G) train a second classification model with the training dataset;
(H) execute the trained second classification model with the plurality of unclassified observation vectors to determine a second probability of the label assignment to each observation vector of the plurality of unclassified observation vectors and to predict a second target variable value for each observation vector of the plurality of unclassified observation vectors;
(I) compute a classifier weight for the trained second classification model using the determined second probability of the label assignment and the second label predicted for each observation vector of the plurality of unclassified observation vectors;
(J) update the classification function using the computed classifier weight and the second label predicted for each observation vector of the plurality of unclassified observation vectors;
(K) repeat (A) through (J) until a convergence parameter value indicates the classifier weight has converged; and
output the second label predicted for each observation vector of the plurality of unclassified observation vectors.

2. The non-transitory computer-readable medium of claim 1, wherein computing the similarity matrix comprises:
computing an affinity matrix using the kernel function and the plurality of observation vectors; and
computing a diagonal matrix by summing each row of the computed affinity matrix, wherein the sum of each row is stored in a diagonal of a respective row with zeroes in remaining positions of the respective row;
wherein the similarity matrix is computed from the affinity matrix and the diagonal matrix.

3. The non-transitory computer-readable medium of claim 2, wherein the similarity matrix is computed using $S = D^{-1/2} W D^{-1/2}$, where S is the similarity matrix, D is the computed diagonal matrix, and W is the computed affinity matrix.

4. The non-transitory computer-readable medium of claim 3, wherein the affinity matrix is computed using $$W_{i,j} = \exp\frac{-\|x_i - x_j\|^2}{2s^2}$$

if $i \neq j$ and $W_{ii} = 0$ for $i = j$, for $i = 1, \ldots, N$ and $j = 1, \ldots, N$, where s is a predefined kernel parameter value, $x_i$ is an $i^{th}$ observation vector of the plurality of observation vectors, $x_j$ is a $j^{th}$ observation vector of the plurality of observation vectors, N is a number of the plurality of observation vectors, and $\|\ \|$ indicates a norm value.

5. The non-transitory computer-readable medium of claim 1, wherein before (A), the computer-readable instructions further cause the computing device to initialize the classifier weight by, for each unclassified observation vector:
(L) normalizing an output of the executed, trained classification model to define a probability value for each permissible unique target variable value; and
(M) updating each defined value using a predefined weight value and the determined probability value for each permissible unique target variable value,
wherein the classifier weight is initialized using each updated defined value and the label predicted for each observation vector of the plurality of unclassified observation vectors.

6. The non-transitory computer-readable medium of claim 5, wherein the classifier weight is initialized using $$\alpha_1 = \frac{1}{4}\ln\frac{\sum_{i=1}^{N_u} p_i\delta(h(x_i), 1) + \sum_{i=1}^{N_u} q_i\delta(h(x_i), -1)}{\sum_{i=1}^{N_u} p_i\delta(h(x_i), -1) + \sum_{i=1}^{N_u} q_i\delta(h(x_i), 1)},$$

where $\alpha_1$ is a classifier weight for a first trained classification model, $p_i$ is an $i^{th}$ updated defined value for a first unique target variable value, $q_i$ is an $i^{th}$ updated defined value for a second unique target variable value, $h(x_i)$ is the target variable value predicted by the first trained classification model for the $i^{th}$ observation vector of the plurality of unclassified observation vectors, $x_i$ is the $i^{th}$ observation vector of the plurality of unclassified observation vectors, $N_u$ is a number of the plurality of unclassified observation vectors, and $\delta(\ )$ indicates a delta function, where $\delta(h(x_i), 1) = 1$ when $h(x_i) = 1$, or $\delta(h(x_i), 1) = 0$, when $h(x_i) \neq 1$, and $\delta(h(x_i), -1) = 1$ when $h(x_i) = -1$, or $\delta(h(x_i), -1) = 0$, when $h(x_i) \neq -1$.

7. The non-transitory computer-readable medium of claim 6, wherein $p_i$ is updated in (M) using $p_i = wp_i + (1-w)d_i$, $i = 1, \ldots, N_u$, and $q_i$ is updated in (M) using $q_i = wq_i + (1-w)(1-d_i)$, $i = 1, \ldots, N_u$ for a binary classification model, where $d_i$ is the determined probability value that the first unique target variable value is predicted for the $i^{th}$ observation vector of the plurality of unclassified observation vectors, and w is the predefined weight value.

8. The non-transitory computer-readable medium of claim 6, wherein, before (A), the computer-readable instructions further cause the computing device to:
   initialize a classification function using the initialized classifier weight and the label predicted for each observation vector of the plurality of unclassified observation vectors.

9. The non-transitory computer-readable medium of claim 8, wherein the classifier function is initialized using $H(X)=\alpha_1 h=1, \ldots, N_u$.

10. The non-transitory computer-readable medium of claim 5, wherein the predefined weight value is defined based on a comparison between $N_u$ and $N_C$, where $N_u$ is a number of the plurality of unclassified observation vectors, and $N_C$ is a number of the plurality of classified observation vectors.

11. The non-transitory computer-readable medium of claim 1, wherein a first similarity value of the similarity values for each observation vector of the plurality of unclassified observation vectors is computed in (A) using $$p_i = \sum_{j=1}^{N_C} S_{i,j} e^{-2H_i} \delta(y_j, 1) + \frac{w_1}{2} \sum_{j=1}^{N_u} S_{i,j} e^{H_i - H_j},$$

$i=1, \ldots, N_u$, where $p_i$ is the first similarity value for an $i^{th}$ observation vector of the plurality of unclassified observation vectors, $S_{i,j}$ is a similarity value of the similarity matrix computed between the $i^{th}$ observation vector and a $j^{th}$ observation vector of the plurality of unclassified observation vectors, $H_i$ is a classifier function value for the $i^{th}$ observation vector, $H_j$ is a classifier function value for the $j^{th}$ observation vector, $y_j$ is the target variable value predicted for the $j^{th}$ observation vector, $w_1$ is a predefined first weight value, $\delta(\ )$ indicates a delta function, where $\delta(y_j,1)=1$ when $y_j=1$, or $\delta(y_j,1)=0$, when $y_j \neq 1$, $N_u$ is a number of the plurality of unclassified observation vectors, and $N_C$ is a number of the plurality of classified observation vectors.

12. The non-transitory computer-readable medium of claim 11, wherein a second similarity value of the similarity values for each observation vector of the plurality of unclassified observation vectors is computed in (A) using $$q_i = \sum_{j=1}^{N_C} S_{i,j} e^{-2H_i} \delta(y_j, -1) + \frac{w_1}{2} \sum_{j=1}^{N_u} S_{i,j} e^{H_j - H_i},$$

$i=1, \ldots, N_u$, where $q_i$ is the second similarity value for the $i^{th}$ observation vector of the plurality of unclassified observation vectors, and $\delta(y_j, -1)=1$ when $y_j=-1$, or $\delta(y_j, -1)=0$, when $y_j \neq -1$.

13. The non-transitory computer-readable medium of claim 12, wherein the first similarity value and the second similarity value are further updated in (A) using $(p_i, q_i)=\text{softmax}(p_i, q_i)$, where a function softmax normalizes each $p_i$ and $q_i$ into a probability distribution value between zero and one that is proportional to an exponential of $p_i, i=1, \ldots, N_u$ and $q_i, i=1, \ldots, N_u$, respectively, and replaces $p_i$ and $q_i$ with the normalized values.

14. The non-transitory computer-readable medium of claim 13, wherein, after applying the softmax function, the first similarity value and the second similarity value are further updated in (A) using $p_i = w_2 p_i + (1-w_2) d_i$, $i=1, \ldots, N_u$, and $q_i = w_2 q_i + (1-w_2)(1-d_i)$, $i=1, \ldots, N_u$, where $d_i$ is a probability that a first unique target variable value is predicted for the $i^{th}$ observation vector of the plurality of unclassified observation vectors, and $w_2$ is a predefined second weight value.

15. The non-transitory computer-readable medium of claim 14, wherein the predefined second weight value is defined based on a comparison between $N_u$ and $N_C$.

16. The non-transitory computer-readable medium of claim 14, wherein the second classifier weight is computed using $$\alpha = \frac{1}{4} \ln \frac{\sum_{i=1}^{N_u} p_i \delta(h(x_i), 1) + \sum_{i=1}^{N_u} q_i \delta(h(x_i), -1)}{\sum_{i=1}^{N_u} p_i \delta(h(x_i), -1) + \sum_{i=1}^{N_u} q_i \delta(h(x_i), 1)},$$

where $\alpha$ is the second classifier weight, $h(x_i)$ is the second label predicted by the trained second classification model for the $i^{th}$ observation vector of the plurality of unclassified observation vectors, $x_i$ is the $i^{th}$ observation vector of the plurality of unclassified observation vectors, and $\delta(\ )$ indicates a delta function, where $\delta(h(x_i),1)=1$ when $h(x_i)=1$, or $\delta(h(x_i),1)=0$, when $h(x_i)\neq 1$, and $\delta(h(x_i), -1)=1$ when $h(x_i)=-1$, or $\delta(h(x_i),-1)=0$, when $h(x_i)\neq -1$.

17. The non-transitory computer-readable medium of claim 16, wherein the classifier function is updated using $H(X)=H(X)+\alpha h(x_i), i=1, \ldots, N_u$, wherein $H(X)$ is a previous classifier function.

18. The non-transitory computer-readable medium of claim 1, wherein the confidence value for each observation vector of the plurality of unclassified observation vectors is computed using $\text{abs}(p_i - q_i)=1, \ldots, N_u$, where $p_i$ is a first similarity value of the similarity values for an $i^{th}$ observation vector of the plurality of unclassified observation vectors for a first unique target variable value, and $q_i$ is a second similarity value of the similarity values for the $i^{th}$ observation vector for a second unique target variable value.

19. The non-transitory computer-readable medium of claim 1, wherein the low-confidence threshold value is a quantile value computed from the confidence values computed in (B) for a predefined low-confidence quantile level.

20. The non-transitory computer-readable medium of claim 1, wherein the high-confidence threshold value is a quantile value computed from the confidence values computed in (B) for a predefined high-confidence quantile level.

21. The non-transitory computer-readable medium of claim 1, wherein the convergence parameter value is a number of iterations of (A) exceeding a predefined maximum number of iterations.

22. The non-transitory computer-readable medium of claim 1, wherein the convergence parameter value is based on a difference between the classifier weight computed in (I) and the classifier weight computed in a previous iteration of (I) being less than or equal to a predefined convergence value.

23. The non-transitory computer-readable medium of claim 1, wherein, after (K), the computer-readable instructions further cause the computing device to output the second classification model trained on a last iteration of (G) as a final trained classification model.

24. The non-transitory computer-readable medium of claim 23, wherein, after (K), the computer-readable instructions further cause the computing device to:

read a new observation vector from a dataset;
input the read new observation vector to the final trained classification model to predict a third target variable value for the read new observation vector; and
output the predicted third target variable value.

25. The non-transitory computer-readable medium of claim 1, wherein the plurality of unclassified observation vectors are distributed across a plurality of computing devices and the plurality of classified observation vectors are stored on each computing device of the plurality of computing devices, wherein the computing device is one of the plurality of computing devices,
wherein the computer-readable instructions are performed on each computing device of the plurality of computing devices using the plurality of classified observation vectors and the plurality of unclassified observation vectors distributed to each respective computing device.

26. The non-transitory computer-readable medium of claim 1, wherein the plurality of unclassified observation vectors are distributed across a plurality of threads and the plurality of classified observation vectors are stored on each thread of the plurality of threads,
wherein the computer-readable instructions are performed on each thread of the plurality of threads using the plurality of classified observation vectors and the plurality of unclassified observation vectors distributed to each respective thread.

27. The non-transitory computer-readable medium of claim 1, wherein the similarity values are further updated in (A) using a softmax function that normalizes each similarity value into a probability distribution value between zero and one that is proportional to an exponential of each similarity value.

28. The non-transitory computer-readable medium of claim 27, wherein, after applying the softmax function, the similarity values are further updated in (A) using $s_{i,j}=w_2 s_{i,j}+(1-w_2)d_{i,j}$, $i=1, \ldots, N_u$, $j=1, \ldots, N_l$, where $s_{i,j}$ is a $j^{th}$ similarity value for the $i^{th}$ observation vector of the plurality of unclassified observation vectors, $d_{i,j}$ is a $j^{th}$ probability that a first unique target variable value is predicted for the $i^{th}$ observation vector of the plurality of unclassified observation vectors, $w_2$ is a predefined second weight value, $N_u$ is a number of the plurality of unclassified observation vectors, and $N_l$ is a number of permissible unique target variable values.

29. A computing device comprising:
a processor; and
a computer-readable medium operably coupled to the processor, the computer-readable medium having computer-readable instructions stored thereon that, when executed by the processor, cause the computing device to
compute a similarity matrix using a kernel function with a plurality of observation vectors, wherein the plurality of observation vectors includes a plurality of unclassified observation vectors and a plurality of classified observation vectors, wherein a target variable value is defined to represent a label for each respective observation vector of the plurality of classified observation vectors, wherein the target variable value is not defined to represent the label for each respective observation vector of the plurality of unclassified observation vectors;
train a classification model with the plurality of classified observation vectors;
execute the trained classification model with the plurality of unclassified observation vectors to determine a probability of a label assignment to each observation vector of the plurality of unclassified observation vectors and to predict the target variable value for each observation vector of the plurality of unclassified observation vectors;

(A) compute similarity values for each observation vector of the plurality of unclassified observation vectors and for each permissible unique target variable value using a classification function and the computed similarity matrix;
(B) compute a confidence value for each observation vector of the plurality of unclassified observation vectors using the computed similarity values for each respective observation vector of the plurality of unclassified observation vectors;
(C) compute a high-confidence threshold value from confidence values computed in (B) for the plurality of unclassified observation vectors;
(D) compute a low-confidence threshold value from the confidence values computed in (B);
(E) initialize a training dataset with each observation vector of the plurality of classified observation vectors;
(F) for each observation vector of the plurality of unclassified observation vectors,
when the confidence value for a respective observation vector of the plurality of unclassified observation vectors is greater than the computed high-confidence threshold value, add the respective observation vector to the training dataset; and
when the confidence value for a respective observation vector of the plurality of unclassified observation vectors is greater than the computed low-confidence threshold value and less than the computed high-confidence threshold value, add the respective observation vector to the training dataset based on a comparison between a random value drawn from a uniform distribution and a predefined inclusion percentage value;
(G) train a second classification model with the training dataset;
(H) execute the trained second classification model with the plurality of unclassified observation vectors to determine a second probability of the label assignment to each observation vector of the plurality of unclassified observation vectors and to predict a second target variable value for each observation vector of the plurality of unclassified observation vectors;
(I) compute a classifier weight for the trained second classification model using the determined second probability of the label assignment and the second label predicted for each observation vector of the plurality of unclassified observation vectors;
(J) update the classification function using the computed classifier weight and the second label predicted for each observation vector of the plurality of unclassified observation vectors;
(K) repeat (A) through (J) until a convergence parameter value indicates the classifier weight has converged; and
output the second label predicted for each observation vector of the plurality of unclassified observation vectors.

30. A method of classifying data using semi-supervised data, the method comprising:

computing, by a computing device, a similarity matrix using a kernel function with a plurality of observation vectors, wherein the plurality of observation vectors includes a plurality of unclassified observation vectors and a plurality of classified observation vectors, wherein a target variable value is defined to represent a label for each respective observation vector of the plurality of classified observation vectors, wherein the target variable value is not defined to represent the label for each respective observation vector of the plurality of unclassified observation vectors;

training, by the computing device, a classification model with the plurality of classified observation vectors;

executing, by the computing device, the trained classification model with the plurality of unclassified observation vectors to determine a probability of a label assignment to each observation vector of the plurality of unclassified observation vectors and to predict the target variable value for each observation vector of the plurality of unclassified observation vectors;

(A) computing, by the computing device, similarity values for each observation vector of the plurality of unclassified observation vectors and for each permissible unique target variable value using a classification function and the computed similarity matrix;

(B) computing, by the computing device, a confidence value for each observation vector of the plurality of unclassified observation vectors using the computed similarity values for each respective observation vector of the plurality of unclassified observation vectors;

(C) computing, by the computing device, a high-confidence threshold value from confidence values computed in (B) for the plurality of unclassified observation vectors;

(D) computing, by the computing device, a low-confidence threshold value from the confidence values computed in (B);

(E) initializing, by the computing device, a training dataset with each observation vector of the plurality of classified observation vectors;

(F) for each observation vector of the plurality of unclassified observation vectors, when the confidence value for a respective observation vector of the plurality of unclassified observation vectors is greater than the computed high-confidence threshold value, adding, by the computing device, the respective observation vector to the training dataset; and when the confidence value for a respective observation vector of the plurality of unclassified observation vectors is greater than the computed low-confidence threshold value and less than the computed high-confidence threshold value, adding, by the computing device, the respective observation vector to the training dataset based on a comparison between a random value drawn from a uniform distribution and a predefined inclusion percentage value;

(G) training, by the computing device, a second classification model with the training dataset;

(H) executing, by the computing device, the trained second classification model with the plurality of unclassified observation vectors to determine a second probability of the label assignment to each observation vector of the plurality of unclassified observation vectors and to predict a second target variable value for each observation vector of the plurality of unclassified observation vectors;

(I) computing, by the computing device, a classifier weight for the trained second classification model using the determined second probability of the label assignment and the second label predicted for each observation vector of the plurality of unclassified observation vectors;

(J) updating, by the computing device, the classification function using the computed classifier weight and the second label predicted for each observation vector of the plurality of unclassified observation vectors;

(K) repeating, by the computing device, (A) through (J) until a convergence parameter value indicates the classifier weight has converged; and outputting, by the computing device, the second label predicted for each observation vector of the plurality of unclassified observation vectors.

* * * * *

UNITED STATES PATENT AND TRADEMARK OFFICE
CERTIFICATE OF CORRECTION

PATENT NO. : 11,200,514 B1
APPLICATION NO. : 17/342825
DATED : December 14, 2021
INVENTOR(S) : Xu Chen et al.

It is certified that error appears in the above-identified patent and that said Letters Patent is hereby corrected as shown below:

In the Specification

Column 14, Line 41:
Delete the phrase "between $N_u$ and N." and replace with --between $N_u$ and $N_C$.--.

In the Claims

Claim 9, Column 35, Line 10:
Delete the phrase "$H(X) = \alpha_1 h = 1, \ldots, N_u$." and replace with --$H(X) = \alpha_1 h(x_i), i = 1, \ldots, N_u$.--.

Signed and Sealed this
Seventeenth Day of May, 2022

*Katherine Kelly Vidal*

Katherine Kelly Vidal
*Director of the United States Patent and Trademark Office*